US010677229B2

(12) United States Patent
Kessler et al.

(10) Patent No.: US 10,677,229 B2
(45) Date of Patent: Jun. 9, 2020

(54) THERMALLY DRIVEN ACTUATOR SYSTEM

(71) Applicants: Metis Design Corporation, Boston, MA (US); Embraer S.A., São José dos Campos (BR)

(72) Inventors: Seth S. Kessler, Newton, MA (US); Fabio Santos da Silva, São Jose dos Campos (BR); Rodrigo Carlana da Silva, São Jose dos Campos (BR); Cassio Wallner, São Jose dos Campos (BR); Paulo Anchieta da Silva, São Jose dos Campos (BR); Estelle Cohen, Brookline, MA (US)

(73) Assignees: Metis Design Corporation, Boston, MA (US); Embraer S.A., Sao Jose dos Campos (BR)

( * ) Notice: Subject to any disclaimer, the term of this patent is extended or adjusted under 35 U.S.C. 154(b) by 0 days.

(21) Appl. No.: 15/910,584

(22) Filed: Mar. 2, 2018

(65) Prior Publication Data
US 2018/0258920 A1    Sep. 13, 2018

Related U.S. Application Data

(60) Provisional application No. 62/466,805, filed on Mar. 3, 2017.

(51) Int. Cl.
*F03G 7/06* (2006.01)
*H05B 1/02* (2006.01)
(Continued)

(52) U.S. Cl.
CPC .......... *F03G 7/065* (2013.01); *H05B 1/0294* (2013.01); *H05B 3/06* (2013.01); *H05B 3/145* (2013.01); *H05B 2203/005* (2013.01)

(58) Field of Classification Search
CPC ..... F03G 7/06; F03G 7/065; H05B 2203/005; H05B 1/0294; H05B 3/06; H05B 3/145
See application file for complete search history.

(56) References Cited

U.S. PATENT DOCUMENTS 4,523,085 A * 6/1985 Grise .................... H05B 3/565
                                                    174/254
5,278,442 A    1/1994 Prinz et al.
(Continued)

FOREIGN PATENT DOCUMENTS

EP    1076774 A1    2/2001
WO    1998/29657 A1    7/1998
(Continued)

OTHER PUBLICATIONS

International Search Report and Written Opinion for Application No. PCT/BR2018000008, dated May 28, 2018. 10 pages.

*Primary Examiner* — Mark A Laurenzi
*Assistant Examiner* — Xiaoting Hu
(74) *Attorney, Agent, or Firm* — Nixon & Vanderhye, P.C.

(57) ABSTRACT

Exemplary embodiments are directed to thermally driven actuator systems including a thermally driven element and one or more heating elements coupled to and in thermal contact with the thermally driven element. The thermally driven element can be capable of being selectively reconfigured in shape based on a thermal strain or temperature driven phase change. The one or more heating elements can be configured to selectively and independently apply heat to one or more of a plurality of different regions of the thermally driven element to selectively raise a temperature or temperatures of the selected region or regions of the thermally driven element to selectively reconfigure the shape of the thermally driven element.

44 Claims, 15 Drawing Sheets

(51) Int. Cl.
*H05B 3/06* (2006.01)
*H05B 3/14* (2006.01)

(56) References Cited

U.S. PATENT DOCUMENTS

| | | | | |
|---|---|---|---|---|
| 6,072,154 | A * | 6/2000 | Maynard | A61B 1/0058 |
| | | | | 219/209 |
| 7,188,473 | B1 * | 3/2007 | Asada | F03G 7/065 |
| | | | | 310/306 |
| 7,270,844 | B2 | 9/2007 | Renn | |
| 7,575,807 | B1 * | 8/2009 | Barvosa-Carter | F03G 7/065 |
| | | | | 428/411.1 |
| 2007/0246979 | A1 | 10/2007 | Browne et al. | |
| 2011/0240621 | A1 * | 10/2011 | Kessler | G01N 25/72 |
| | | | | 219/200 |
| 2018/0266401 | A1 * | 9/2018 | van den Ende | H05B 3/0004 |

FOREIGN PATENT DOCUMENTS

| | | | |
|---|---|---|---|
| WO | 1999/60267 | A1 | 11/1999 |
| WO | 2006/062608 | A2 | 6/2006 |

\* cited by examiner

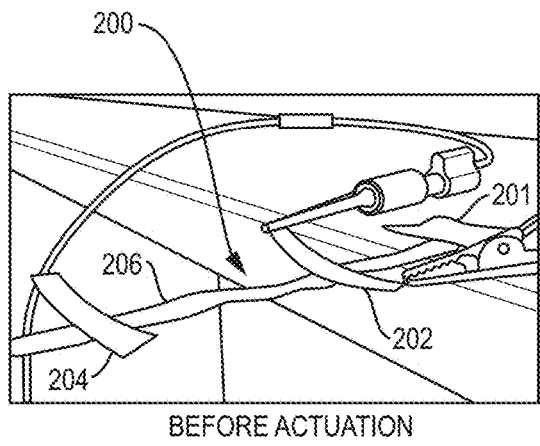
FIG. 13A  BEFORE ACTUATION
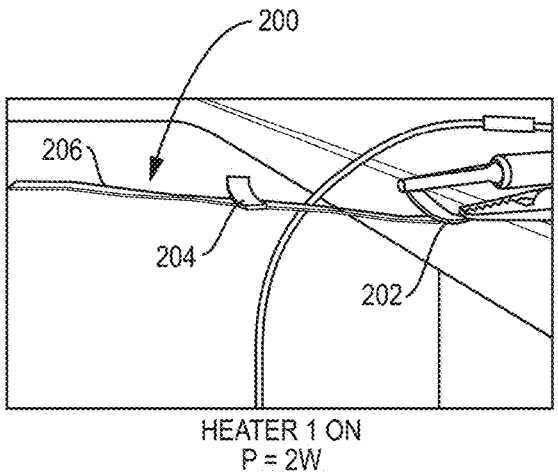
FIG. 13B  HEATER 1 ON  P = 2W
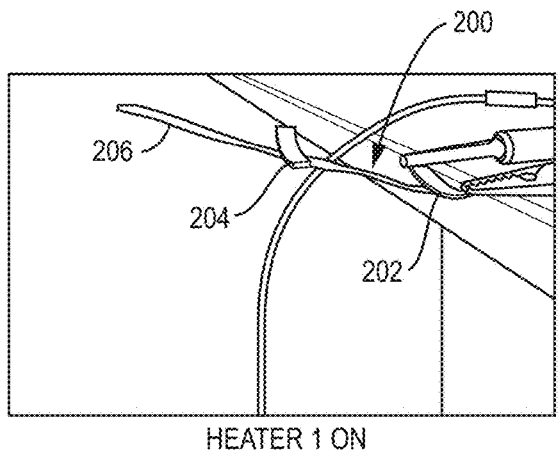
FIG. 13C  HEATER 1 ON  P = 3.5W
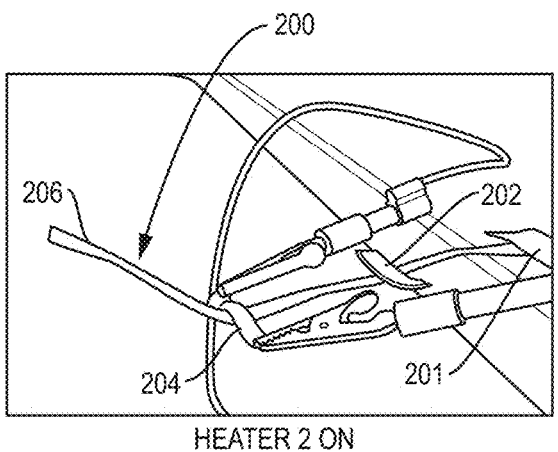
FIG. 13D  HEATER 2 ON  P = 2W
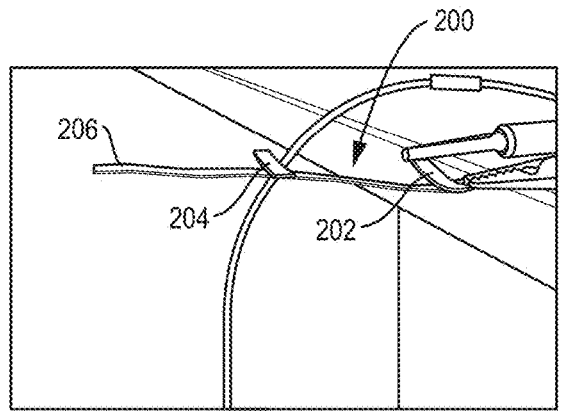
FIG. 13E  HEATERS OFF

BEFORE ACTUATION

HEATER 1
P = 2W

HEATER 2
P = 2W

HEATER 3
P = 2W

HEATERS OFF

THERMALLY DRIVEN ACTUATOR SYSTEM

CROSS-REFERENCE TO RELATED APPLICATIONS

This application claims the benefit of co-pending, commonly assigned U.S. Provisional Patent Application No. 62/466,805, which was filed on Mar. 3, 2017. The entire content of the foregoing provisional patent application is incorporated herein by reference.

TECHNICAL FIELD

The present disclosure relates to a thermally driven actuator system and, in particular, to a thermally driven actuator system that achieves customizable positioning into multiple configurations based on selective heat application.

BACKGROUND

Traditional actuators generally use hydraulics, pneumatics or electrical motors to actuate structural components. However, such traditional actuator systems can be heavy and prone to failure over time due to pressures, stresses or quantity of moving parts. Some alternatives to traditional actuators use electroactive polymers (EAPs) or shape memory alloys (SMAs) to transition a structural component between two different stable configurations. Generally, SMAs have two preformed stable configurations which are achieved based on a material phase change at a specific temperature. Thus, traditional EAPs or SMAs are capable of achieving two different stable configurations, and do not provide for customizable positioning of the structure into multiple desired configurations.

SUMMARY

In accordance with some embodiments of the present disclosure, an exemplary thermally driven actuator system including a thermally driven element (e.g., a temperature sensitive element) and one or more heating elements is provided. As described herein, the thermally driven element can include, e.g., one or more shape memory materials such as a shape memory alloy or a shape memory polymer, one or more materials that exhibit a substantial change in dimension upon the application of heat, any material capable of significant temperature proportional displacement, combinations thereof, or the like. For example, liquid crystal elastomers, which are not shape memory materials, can be employed in the thermally driven element because they respond proportionally to heat application in a significant way. The thermally driven element is capable of being selectively reconfigured in shape in response to heat applied to one or more regions of the thermally driven element. In some embodiments, the reconfiguration can occur based on a material phase change in at least a portion of the thermally driven element that occurs at a predetermined temperature (e.g., such as for a shape memory alloy or a shape memory polymer). In some embodiments, the reconfiguration can occur without a material phase change of at least a portion of the thermally driven element. In some embodiments, the reconfiguration can occur based on a thermal strain that is proportional to temperature (e.g., such as for a liquid crystal elastomer) or based on a phase change that occurs over a range of temperatures.

The one or more heating elements are coupled to and in thermal contact with the thermally driven element. The one or more heating elements are configured to selectively and independently apply heat to one or more of a plurality of different regions of the thermally driven element to selectively raise a temperature or temperatures of the selected region or regions of the thermally driven element to selectively reconfigure the shape of the thermally driven element.

In some embodiments, the thermally driven element includes a shape memory alloy, a shape memory polymer, a liquid crystal elastomer, or any combination of the aforementioned, that is used to drive the actuator force. In some such embodiments, a predetermined temperature for transition of the thermally driven material used is implemented for actuation. In some embodiments, the one or more heating elements are configured to selective raise a temperature or temperature of the selected region or regions of the thermally driven element to at least the predetermined temperature. In some embodiments, a degree of transition is proportional to a raise in temperature of the relevant region of thermally driven element.

In some embodiments, the thermally driven element comprises a hybrid element formed from a combination of two or more of a shape memory alloy, a shape memory polymer, and a liquid crystal elastomer. In some embodiments, the hybrid element includes a thermal shape memory material, such as a shape memory alloy or a thermal shape memory polymer, and a material that undergoes a more proportional change in dimension with temperature, such as a liquid crystal elastomer. In some such embodiments, the thermal shape memory material can be used to make a large or gross change in configuration by heating one or more a regions of the hybrid element to above a predetermined transition temperature associated with a phase change in the shape memory material, and then smaller (e.g., fine tuning) adjustments to the configuration can be made by changes to the temperature of the one or more regions of the hybrid element that still keep the temperature above the predetermined temperature. In some embodiments, a hybrid element includes multiple different shape memory materials, which may have different predetermined transition temperatures. For example, a hybrid element including both a shape memory alloy and a thermal shape memory polymer would have a predetermined transition temperature associated with each. In some embodiments where the hybrid element includes a first shape memory material and a second shape memory material, heating one or more regions of the hybrid element to above a first predetermined temperature associated with the first shape memory material would cause the hybrid element to transition to a first configuration and further heating of the same one or more regions of the hybrid element to above a second predetermined temperature associate with the second shape memory material would cause the hybrid element to transition to a second configuration.

In some embodiments, a thermally driven element includes both a thermally driven material and an active material that is not thermally driven, such as an electroactive polymer, a magnetostrictive material, a magneto fluid, or any combination of the aforementioned. For example, in some embodiments, a thermally driven element could include a shape memory material and an electroactive polymer whose shape or dimension is modified by an applied electric field.

In some embodiments, the one or more heating elements are configured to selectively apply heat to the plurality of different regions of the thermally driven element in a variable or customizable heating pattern. As discussed herein, the variable or customizable heating pattern refers to the ability to apply heat to the different regions in different patterns based on the input at a controller. Thus, rather than providing the same heating pattern to the same regions during each operation, the amount of heat and the location of the applied heat can be varied as needed to achieve multiple customizable configurations of the thermally driven element. In some embodiments, the thermally driven element is capable of being selectively reconfigured into shapes having three or more different configurations.

In some embodiments, the one or more heating elements include a plurality of heating elements with each heating element coupled to a corresponding one of the plurality of different regions of the thermally driven element. In some embodiments, the plurality of different regions are arranged longitudinally along a length of the thermally driven element. In some embodiments, the plurality of different regions are arranged laterally along a width of the thermally driven element. In some embodiments, some of the plurality of different regions are arranged laterally along a width of the thermally driven element and others of the plurality of different regions are arrange longitudinally along a length of the thermally driven element. In some embodiments, some of the plurality of different regions are arranged diagonally relative to a width and length of the thermally driven element. In some embodiments, the different regions are arranged radially. Different arrangements of regions enable different types of actuation. For example, the lateral, longitudinal and/or radial application or applications of heat to the top and/or bottom of the thermally driven element differentially can drive axial actuation, bending, torsional actuation, combinations thereof, or the like.

In some embodiments, the one or more heating elements include a heating element having multiple zones corresponding to different regions of the thermally driven element, with each zone configured to be independently heated. In some embodiments, the multiple zones are spatially separated from each other. In some embodiments, the one or more heating elements includes a plurality of heating elements with each heating element configured to be independently heated and corresponding to a region of the thermally driven element.

In some embodiments, the one or more heating elements include one or more carbon nanotube (CNT) networks. In some embodiments, the CNT network includes a sheet of zones corresponding to the plurality of different regions of the thermally driven element, each zone configured to be independently heated.

In some embodiments, the one or more heating elements include one or more dielectric layers connected to the CNT network.

In some embodiments, the one or more heating elements include heating wires passing through the thermally driven element.

In some embodiments, the system also includes a controller in communication with the one or more heating elements for regulation of the heat applied to the plurality of different regions of the thermally driven element. In some embodiments, the controller includes a multi-channel variable voltage controller or a multiplexed variable voltage controller. In some embodiments, the system also includes a sensor coupled to the thermally driven element or to at least one of the one or more heating elements. In some embodiments, the sensor is configured to generate a signal related to a temperature of at least a portion of the thermally driven element. In some embodiments the sensor is configured to transmit a temperature signal regarding at least a portion of the thermally driven element to a controller. In some embodiments, a controller of the system receives a signal related to a temperature of at least a portion of the thermally driven element from the sensor. In some embodiments, the system can include a plurality of sensors coupled to the thermally driven element or the at least one heating element. In some embodiments, each sensor is configured to generate a signal related to a temperature regarding a corresponding region of the thermally driven element. In some embodiments, each sensor configured to transmit a temperature signal regarding a corresponding region of the thermally driven element to a controller. In some embodiments, a controller of the system receives a temperature signal regarding a corresponding region of the thermally driven element from each of the sensors.

In some embodiments, the system also includes one or more transducers coupled to the thermally driven element or to at least one of the one or more heating elements. In some embodiments the one or more transducers are configured to generate a signal or signals related to a position or a deflection of at least a portion of the thermally driven element. In some embodiments, the one or more transducers are configured to transmit a signal or signals to a controller regarding a position or a deflection of at least a portion of the thermally driven element. In some embodiments, a controller of the system receives a signal or signals related to a position or deflection of at least a portion of the thermally driven element from the one or more transducers.

In some embodiments, each of the one or more heating elements has a first side facing toward the thermally driven element and a second side facing away from the thermally driven element. In such embodiments, the system includes thermal insulation disposed on the second side of each of the one or more heating elements. In some embodiments, the system includes film adhesive encapsulating the one or more heating elements.

In some embodiments, the thermally driven element is configured to be coupled to a structural element such that reconfiguration of the shape of the thermally driven element substantially simultaneously reconfigures the shape of the structural element. In some embodiments, the thermally driven element is configured to be coupled to a first portion of the structural element, and the system further include a second thermally driven element and one or more additional heating elements coupled to and in thermal contact with the second thermally driven element. In some embodiments, the second thermally driven element is capable of being selectively reconfigured in shape based on a material phase change that occurs at the predetermined temperature. In some embodiments, the second thermally driven element is configured to be coupled to or is coupled to a second portion of the structural element. In some embodiments, the one or more additional heating elements are configured to selectively and independently apply heat to one or more of a plurality of different regions of the second thermally driven element to selectively raise a temperature or temperatures of the selected region or regions of the second thermally driven element to at least the predetermined temperature to selectively reconfigure the shape of the second thermally driven element.

In some embodiments, each heating element is coupled to and corresponds with a respective thermally driven element, such that each thermally driven element is coupled to its own heating element. In some embodiments, multiple heating elements are coupled to each thermally driven element. In some embodiments, a single heating element can be used to actuate two or more different thermally driven elements or two or more different regions of a thermally driven element. For example, in some embodiments, using a single heating element on two or more different thermally driven elements can be used to achieve differential strain for bending of the thermally driven elements. As a further example, in some embodiments, for hybrid thermally driven elements, a single heating element can be implemented to heat the different types of thermally driven materials employed in the hybrid thermally driven element (e.g., shape memory alloy, shape memory alloy fiber in a shape memory polymer matrix, or the like).

In accordance with some embodiments of the present disclosure, an exemplary thermally driven actuator including a hybrid thermally driven element and one or more heating elements is provided. The hybrid thermally driven element is capable of being selectively reconfigured in shape based on a material phase change at one or more predetermined temperatures. The hybrid thermally driven element includes a combination of two or more of a shape memory alloy, a shape memory polymer, and a liquid crystal elastomer. The one or more heating elements are coupled to and in thermal contact with the hybrid thermally driven element. In some embodiments, the one or more heating elements are configured to selectively apply heat to one or more regions of the hybrid thermally driven element to raise a temperature or temperatures of the one or more regions to at least the one or more predetermined temperatures to reconfigure the shape of the thermally driven element. In some embodiments, the reconfiguration of the hybrid thermally driven element can be achieved without a material phase change. For example, if the hybrid thermally driven element includes a liquid crystal elastomer, reconfiguration can be achieved without a phase change. In some embodiments, a hybrid thermally driven element has just one predetermined transition temperature associated with a material phase change. For example, a hybrid thermally driven element including a shape memory alloy and a liquid crystal elastomer would just have one predetermined transition temperature associated with a material phase change, namely that of the shape memory alloy. The liquid crystal elastomer material of the hybrid thermally driven element would not have predetermined transition temperature associated with a material phase change, instead, it would respond proportionally to temperature changes over a range of temperatures.

In accordance with some embodiments of the present disclosure, an exemplary method of reconfiguring a shape of a thermally driven element is provided. The method includes providing a thermally driven actuator system including the thermally driven element and one or more heating elements coupled to and in thermal contact with the thermally driven element. In some embodiments, the thermally driven element is capable of being selectively reconfigured in shape based on a material phase change that occurs at a predetermined temperature. The method includes selectively and independently applying heat to one or more first regions of a plurality of different regions of the thermally driven element with the one or more heating elements to selectively raise a temperature or temperatures of the one or more first regions of the thermally driven element to selectively reconfigure the shape of the thermally driven element from a first configuration to a second configuration. In some embodiments, the temperature or temperature of the one or more first regions of the thermally driven element is raised to at least the predetermined temperature.

In some embodiments, the method further includes selectively and independently applying heat to one or more second regions of a plurality of different regions of the thermally driven element with the one or more heating elements to selectively raise a temperature or temperatures of the one or more second regions of the thermally driven element to selectively reconfigure the shape of the thermally driven element from the first configuration to a second configuration. In such embodiments, at least some of the regions in the one or more second regions are not included in the one or more first regions or at least some of the regions in the one or more first regions are not included in the one or more second regions. In some embodiments, the temperature or temperature of the one or more second regions of the thermally driven element is raised to at least the predetermined temperature.

In some embodiments, the method further includes selectively and independently applying heat to one or more third regions of a plurality of different regions of the thermally driven element with the one or more heating elements to selectively raise a temperature or temperatures of the one or more third regions of the thermally driven element to selectively reconfigure the shape of the thermally driven element from the second configuration to a third configuration. In such embodiments, at least some of the regions in the one or more third regions are not included in the one or more second regions or at least some of the regions in the one or more second regions are not included in the one or more third regions. In some embodiments, the temperature or temperature of the one or more third regions of the thermally driven element is raised to at least the predetermined temperature.

In some embodiments, the one or more heating elements include a CNT network including a sheet of zones corresponding to the plurality of different portions of the thermally driven element. In such embodiments, the method can include selectively and independently heating one or more of the zones of the CNT network. In embodiments employing one or more CNT networks, the method can include determining an intrinsic resistance of the CNT network based on a voltage drop across the CNT network or a current through the CNT network. In such embodiments, the method can further include determining whether the CNT network is damaged based the intrinsic resistance of the CNT network. In such embodiments, the method can further include providing an alert to a user interface based on a determination that the CNT network is damaged.

In some embodiments, the thermally driven actuator system can include a sensor coupled to the thermally driven element or to the at least one heating elements. In such embodiments, the method can include a controller receiving a temperature signal regarding at least a portion of the thermally driven element from the sensor. In some embodiments, the thermally driven actuator system can include a plurality of sensors coupled to the thermally driven element or to the at least one heating element. In such embodiments, the method can include a controller receiving a temperature signal regarding a corresponding region of the thermally driven element from the sensor. In some embodiments, the thermally driven actuator system can include one or more transducers coupled to the thermally driven element or coupled to a structural element to which the thermally driven element is coupled. In such embodiments, the method can include a controller receiving a signal or signals regarding a position or a deflection of at least a portion of the thermally driven element or at least a portion of the structural element from the one or more transducers.

In some embodiments, the method can also include determining whether a position or deflection of the at least a portion of the thermally driven element or of the at least a portion of the structural element is equal to a desired input position or deflection based on the signal or signals from the one or more transducers. In some embodiments, the method can include generating a positive output alert to a user interface where the position or deflection of the at least a portion of the thermally driven element or of the at least a portion of the structural element is determined to be equal to the desired input position or deflection. In some embodiments, the method can include generating a negative output alert to the user interface where the position or deflection of the at least a portion of the thermally driven element or of the at least a portion of the structural element is determined to be different from the desired input position or deflection.

In some embodiments, the thermally driven actuator system includes an electroactive polymer, a magnetostrictive, a magneto fluid, or any combination of the aforementioned. In some embodiments, the thermally driven actuator system includes one or more transducers coupled to the thermally driven element or coupled to a structural member to which the thermally driven element is coupled. In such embodiments, the method can include a controller receiving signal or signals regarding parameter data including acceleration, strain, stress, load, position, or any combination of the aforementioned from the one or more transducers.

In accordance with some embodiments of the present disclosure, an exemplary method for regulating a morphing actuator is provided for achieving a geometry shape modification of a structural platform. The method can include receiving data or information corresponding to an operational phase with mission profiles in operation. The method can include automatically starting a multiplexed variable voltage controller (MVVC) to generate power for a CNT heating element. In some embodiments, starting of the MVVC can be performed by a user voluntarily via input to a controller or automatically based on detected positioning of the structural platform. The method can include automatically reading the temperature and position of the structural platform via transducer sensors coupled to the structural platform. The method can include automatically initiating a shape control of the geometry of the structural platform, receiving transducers signals, and analyzing the temperature and position data. The method can include automatically changing the external shape of a thermally driven element, thereby adapting the structural platform to the mission environment during the operation. The method can include automatically generating an alert warning regarding whether the structural platform has or has not been placed into the desired configuration.

In accordance with some embodiments of the present disclosure, an exemplary thermally driven actuator system is provided. The system includes a sandwiched structure capable of being morphed or reconfigured to achieve a geometry shape modification of a structural platform or element. The system can include a thermally driven element configured to be actuated and morphed based on a material phase change occurring at a specific temperature. In some embodiments, the system includes a CNT network sheet to generate a quickly and uniformly heat the thermally driven element via resisting heating. The system can include a multi-channel or multiplexed variable voltage controller to generate power for the CNT network. The system can include a plurality of transducers to generate temperature and position signals and providing an estimation of the energy level made by MVVC. The system can include one or more dielectric layers for isolation of the CNT network due to its high breakdown voltage and transition temperature. The system can include thermal insulation material on one or more external sides of the CNT sheet to keep the heat localized in a specific region of the thermally driven element and to act as a shield from the external environment. The system can include film adhesive to encapsulate the CNT network sheet.

In some embodiments, an electroactive polymer (EAP), magnetostrictive material, and/or magneto fluid can be used to perform or assist in performing the morphing of the thermally driven element. In some embodiments, the system can include a plurality of transducers producing signals corresponding with the configuration of the thermally driven element, and a processor device to receive and analyze the signals to determine the position or configuration of the thermally driven element. The signals received from the transducers can provide feedback for determining whether the thermally driven element has achieved the desired geometry of the structural platform, and can provide feedback in the form of alerts if the system has not completed or has not properly reconfigured the thermally driven element. In some embodiments, the system can include sensors configured to detect and transmit signals regarding acceleration, strain, stress, load, and/or position on the heating element and/or the thermally driven element. In some embodiments, damage to the CNT network can be measured using intrinsic electrical resistance measurements of the CNT network.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed thermally driven actuator system, reference is made to the accompanying figures, wherein:

FIG. 13A shows an example thermally driven alloy and copper beam prior to segmental actuation with CNT selective heating in multiple zones employed in an example embodiment of the present disclosure;

FIG. 13B shows segmental actuation of an exemplary thermally driven alloy and copper beam using CNT selective heating in zone one at a power P=2 W employed in an example embodiment of the present disclosure;

FIG. 13C shows segmental actuation of an exemplary thermally driven alloy and copper beam using CNT selective heating in zone one at a power P=3.5 W employed in an example embodiment of the present disclosure;

FIG. 13D shows segmental actuation of an exemplary thermally driven alloy and copper beam using CNT network selective heating in zone two at a power P=2 W employed in an example embodiment of the present disclosure;

FIG. 13E shows an exemplary thermally driven alloy and copper beam after segmental actuation using CNT network selective heating in multiple zones after both heaters are turned off in an example embodiment of the present disclosure;

DESCRIPTION OF EXEMPLARY EMBODIMENTS

Figure 1:
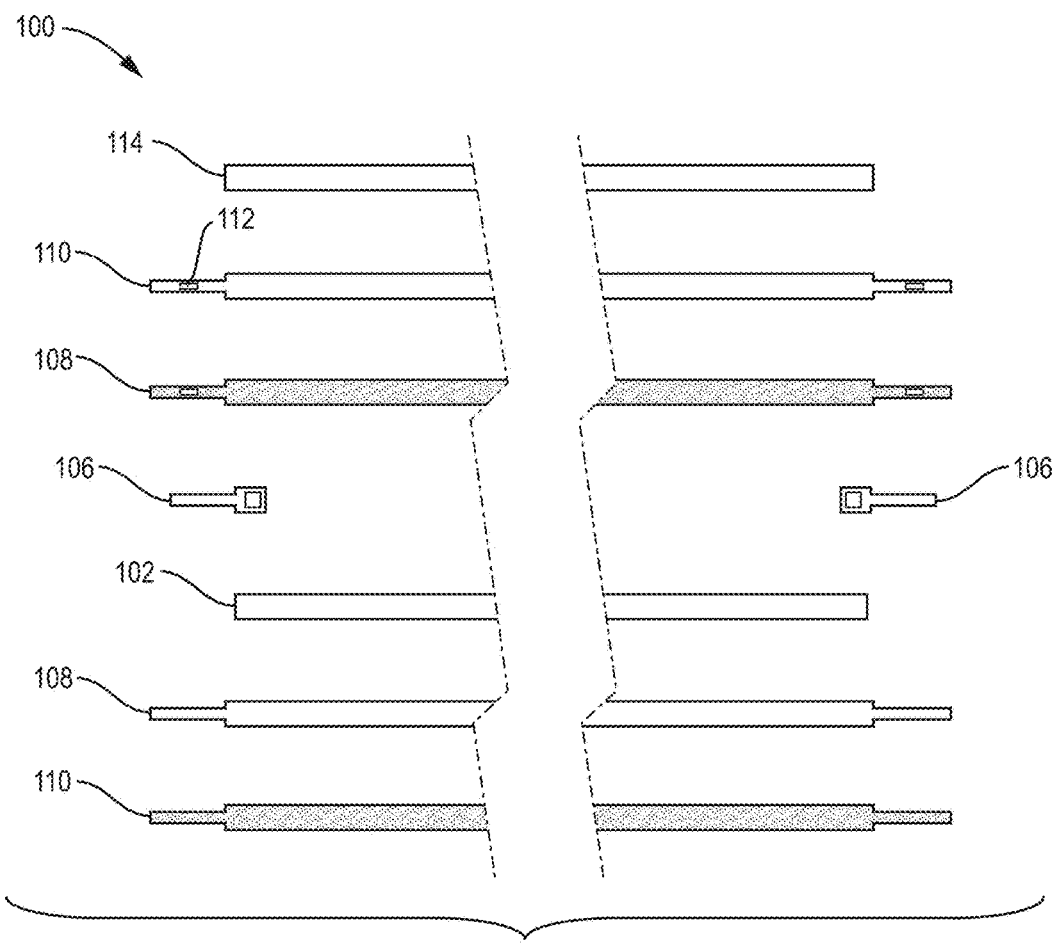
FIG. 1 is a diagrammatic, exploded view of an exemplary heating element assembly of a thermally driven actuator system according to some embodiments of the present disclosure.

Some embodiments of an exemplary thermally driven actuator system described herein include a thermally driven element capable of achieving a substantially continuous and customizable reconfiguration motion by selectively heating regions or zones of the thermally driven element to cause a local change of state. In some embodiments, the thermally driven element is a hybrid thermally driven element formed from a combination of one or more of a shape memory alloy (SMA), a shape memory polymer, and a liquid crystal elastomer. In some embodiments, the thermally driven element includes a shape memory alloy, a shape memory polymer, a liquid crystal elastomer, or any combination of the aforementioned. As described herein, in some embodiments, the SMA is metallic alloy that exhibits structural deformation triggered by heat while remembering its original shape. Upon heating and cooling cycles, the SMA can undergo large deformations without showing residual strains and can recover its original shape through thermal cycles (e.g., the shape memory effect). Such material behavior is due to the material microstructure with two different crystallographic structures: austenite and martensite. Austenite is the crystallographically more-ordered phase and higher modulus, while martensite is the crystallographically less-ordered phase and lower modulus.

The most common shape memory alloy is NITINOL®, a nickel titanium (Ni—Ti) alloy discovered in the 1960s at the U.S. Naval Ordnance Laboratory (NOL). The acronym NiTi-NOL (or NITINOL®) is used herein to refer to Ni—Ti-based shape memory alloys where the mix of the nickel and titanium alters the material response. NITINOL SMA is commonly available in a wire form, among other forms. The SMA wire can have an Austenic transition around about 80° C. In order to impose a shape to an SMA wire, the wire can be annealed at a high temperature (e.g., above 700° C.) and trained into the desired shape at about 500° C. for at least 25 minutes.

The thermally driven actuator system includes one or more heating elements that provide the heat required to actuate the thermally driven element. The one or more heating elements are coupled to and in thermal contact with the thermally driven element. The one or more heating elements are configured to selectively and independently apply heat to one or more of a plurality of different regions of the thermally driven element to selectively raise a temperature or temperatures of the selected region or regions of the thermally driven element to selectively reconfigure the shape of the thermally driven element.

In some embodiments, the one or more heating elements include a heating element having multiple zones corresponding to different regions of the thermally driven element, with each zone configured to be independently heated. In some embodiments, the multiple zones are spatially separated from each other. In some embodiments, the one or more heating elements includes a plurality of heating elements with each heating element configured to be independently heated and corresponding to a region of the thermally driven element.

In some embodiments, the one or more heating elements each include one or more carbon nanotube (CNT) networks that resistively heat. Although some embodiments described herein employ CNT networks for resisting heating, it should be understood that any type of heating element capable of providing heat can be used. For example, heating elements having a low thermal mass, low in-plane thermal conductivity, or the like, can be used. In some embodiments, the CNT network is planar or in the form of a sheet. In some embodiments, the each of the one or more heating elements include a CNT network sheet having multiple zones capable of being independently heated. The more zones that are implemented in the CNT network sheet, the more possible shapes/states the thermally driven element can be configured into. In some embodiments, multiple different heating elements each including a CNT network sheet are employed. In some embodiments, each heating element is coupled to a respective thermally driven element. In some embodiments, multiple heating elements are coupled to different regions of a single thermally driven element. In some embodiments, a single heating element is used to heat regions in multiple different thermally driven elements. Resistive heating in the CNT network(s) enables rapid and uniform heating of the heating element(s) due the high thermal conductivity and relatively low thermal mass of the CNT network coupled with the low in plane thermal conductivity of the CNT network, which enables corresponding rapid and uniform heating of the regions of the thermally driven element to which the CNT network(s) are applied. Because CNT network sheets do not conduct heat in-plane, the heat stays in the desired zones.

Heating elements incorporating CNT network sheets have the benefits of being light weight, durable (e.g., will not corrode), and have an ability to survive high strain and temperatures. In addition, the CNT network sheets can be tailored to meet specific heating requirements.

For the one or more heating elements, each region or zone can be uniquely electroded, and a multi-channel variable voltage controller, a multiplexed variable voltage controller, or a constant voltage supply with a duty-cycle controller, can be used to independently achieve the desired temperatures for the various zones. In some embodiments, thermocouples can be used to provide temperature feedback to a controller and/or a user interface (e.g., a graphical user interface). In some embodiments, the CNT network can be in the form of a continuous sheet with electrodes in various locations to heat portions of the CNT network sheet corresponding to zones. In some embodiments, the CNT network can include separate portions electrically isolated from each other and having their own set of electrodes or contacts. In some embodiments, the electrodes or contacts can be bound together in the same CNT network sheet. In some embodiments, the electrodes or contacts can be in the form of separate or individual CNT network sheets for controlling heating in each individual zone.

In some embodiments, a system includes a thermally driven element, an electronic controller, one or more heating elements, and wiring electrically connecting the electric controller and the one or more heating elements. The controller can provide a desired power or energy density to each of the one or more heating elements or to each zone within the one or more heating elements. In some embodiments, the heating elements include CNT sheet material as resistive heating elements. In some embodiments, the CNT sheet material is sandwiched between two dielectric layers. In some embodiments, thermocouples can be used for voltage and/or duty-cycle feedback to the controller and/or to a user interface.

In some embodiments, the heating element can be thin and flexible, enabling the heating element to be adapted to fit into restricted areas. The heating element can be manufactured in different sizes and/or shapes based on the needs of a given design application. The heating element can be flexible and can be installed in a variety of ways based on the needs of a given design application. In some embodiments, one or more dielectric material layers are applied, attached or coupled to a resistive portion of a heating element for electrical isolation and/or protection. For example, a 2 mm thick dielectric layer of PEEK can be applied to a resistive portion of a heating element or can be included in a heating element for isolation due to its high breakdown voltage and high glass transition temperature. In some embodiments, an additional insulation material (e.g., aerogel, or the like) can be applied on an exterior side of the heating element that faces away from the thermally driven element to keep the heat localized in a region of the thermally driven element and to shield the heating element from an external environment. In some embodiments, the controller is used to detect damage to the heating element through intrinsic electrical resistance measurements of the heating element (e.g., through changes in intrinsic electrical resistance of a CNT network).

Turning to FIG. 1, a diagrammatic, exploded view of an exemplary heating element assembly 100 of a thermally driven actuator system is provided. As will be discussed in greater detail below, the system can include one or more heating element assemblies 100 coupled to and in thermal contact with the thermally driven element such that selective actuation of the heating element assembly 100 results in reconfiguration of the shape of the thermally driven element. The heating element assembly 100 includes one or more heating elements 102. In some embodiments, the each heating element 102 can include a CNT network. In some embodiments, the CNT network has a specific orientation (e.g., anisotropically oriented nanotubes in the plane of the sheet, or the like). In some embodiments, the CNT network has a random orientation (e.g., randomly oriented nanotubes in the plane of the sheet). In some embodiments, the nanotubes in the CNT network are aligned roughly parallel to each other. In some embodiments, the CNT network has an isotropic orientation.

In some embodiments, each heating element 102 can include one or more heating wires, graphene-based heaters, carbon-based heaters, an etched metal, or the like. In some embodiments, the heating element 102 is in the form of a single, substantially continuous structure capable of being heated. In some embodiments, the heating element 102 is in the form of a sheet having multiple segmented regions or zones in which each zone can be independently and selectively heated without affecting the temperature of the adjacent zones. The zones enable controlled and customizable temperature or heating patterns to be applied by the heating element 102. The zones and predetermined pattern of heating applied by the heating element 102 enables the thermally driven element to be reconfigured into multiple customizable shapes having a variety of configurations.

In some embodiments, a plurality of different independent heating elements 102 are employed, with each heating element 102 being independently controlled to heat a different region of the thermally driven element. By individually controlling the heat to each of the specific regions in the desired pattern, the individual regions can be reconfigured to achieve the net shape desired for operation. A predetermined pattern of heating applied to different regions of the thermally driven element by the plurality of different heating element 102 enables the thermally driven element to be reconfigured into multiple customizable shapes having a variety of configurations.

The heating element assembly 100 includes one or more electrodes 106 electrically coupled to the heating element 102. Although illustrated as having two electrodes 106 on opposing sides of the heating element 102, it should be understood that only a single electrode 106 can be implemented. For example, in some embodiments employing a shape memory alloy, the shape memory alloy could be in electrical contact with the heater and could function as an electrical contact for delivering power to the heater. In embodiments having multiple independent zones within the heating element 102, multiple electrodes 106 electrically coupled to the respective zone can be implemented for independent heating at the zones. The electrodes 106 can be coupled to, for example, the top surface of the heating element 102 as shown in FIG. 1.

In some embodiments, a film adhesive 108 can be applied to one or both sides of a planar heating element 102. In some embodiments, the film adhesive 108 substantially encapsulates the heating element 102.

In some embodiments, the heating element assembly 100 includes one or more dielectric layers 110 coupled to one or more sides of the heating element 102. In some embodiments, a dielectric layer 110 is coupled to a first surface of the heating element 102, which faces away from the thermally driven element during use, over the electrodes 106 includes an electrode clearance hole 112 formed therein corresponding with the position of each of the electrodes 106 such that electrical contact with the electrodes 106 can be made. In some embodiments, the heating element assembly 100 can include a thermal insulation layer 114 applied to at least one surface of the heating element 102 (e.g., the surface facing away from the thermally driven element). FIG. 1 shows a heating element assembly 110 including a single thermal insulation layer 114 over a first surface of the heating element 102, which will face away from the thermally driven element during use. Although FIG. 1 shows a thermal insulation 114 over the first surface of the heating element 102, it should be understood that thermal insulation 114 can be applied to any surface of the heating element 102. In some embodiments, the thermal insulation 114 protects the heating element 102 from the external environment. The heating element assembly 100 can be formed from flexible materials such that the heating element assembly 100 can be folded, rolled or reshaped to position the heating element assembly 100 in thermal contact with a thermally driven element.

Figure 2:
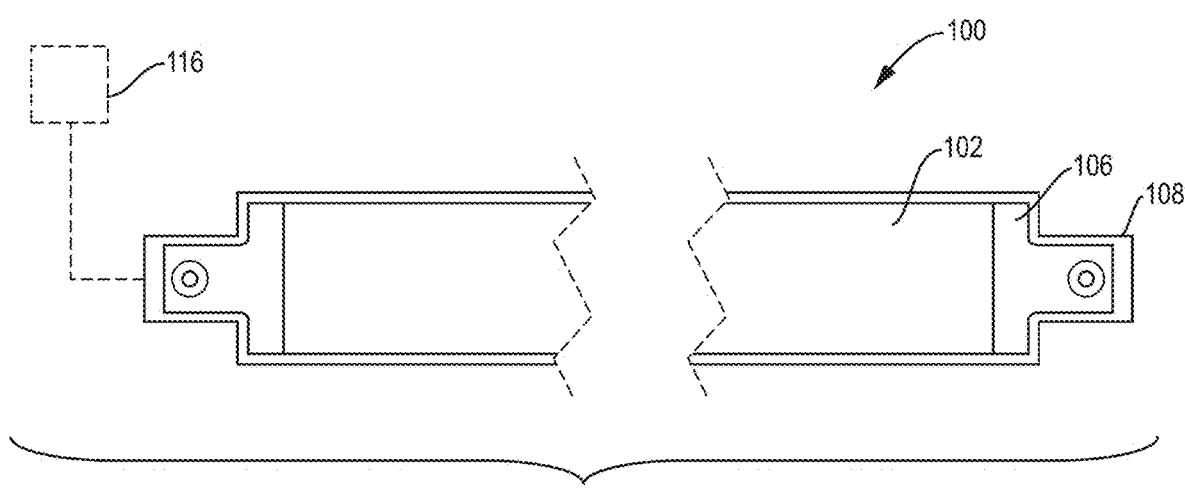
FIG. 2 is diagrammatic top view of the exemplary heating element assembly of FIG. 1.

FIG. 2 is a diagrammatic top view of the heating element assembly 100. The heating element assembly 100 can be in electrical communication via wired and/or wireless means to a controller 116. The controller 116 can include, e.g., a processing device, a transmitted, a receiver, a graphical user interface (GUI), combinations thereof, or the like, and can be configured to receive input for controlled heating of the heating element 102.

Figure 3:
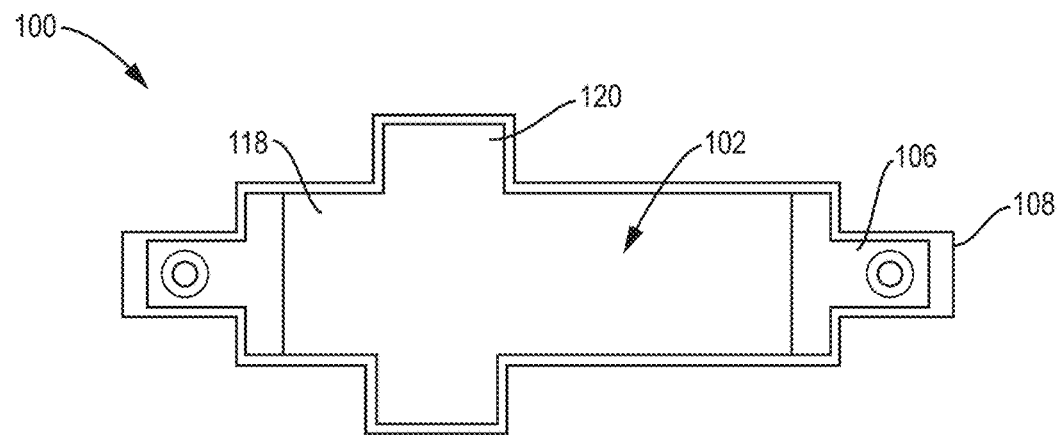
FIG. 3 is a diagrammatic top view of an exemplary heating element assembly of a thermally driven actuator system having a cross-like configuration according to some embodiments of the present disclosure.
Figure 4:
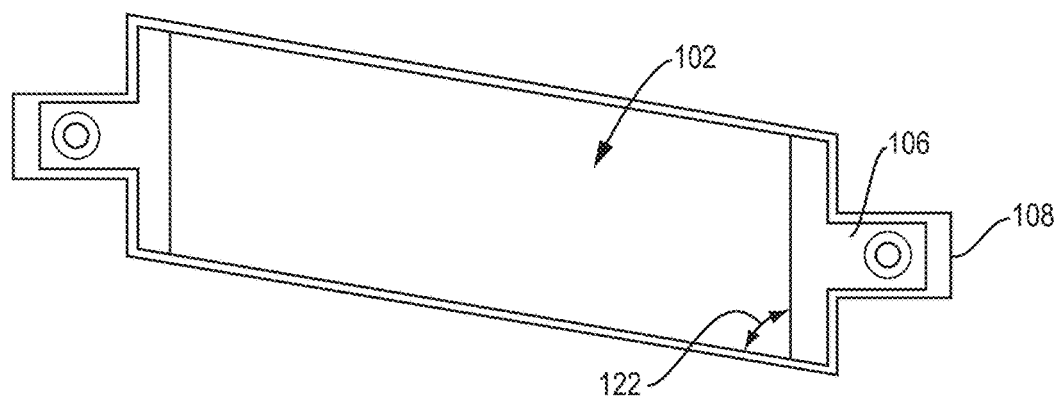
FIG. 4 is a diagrammatic top view of an exemplary heating element assembly of a thermally driven actuator system having an angled configuration according to some embodiments of the present disclosure.
Figure 5:
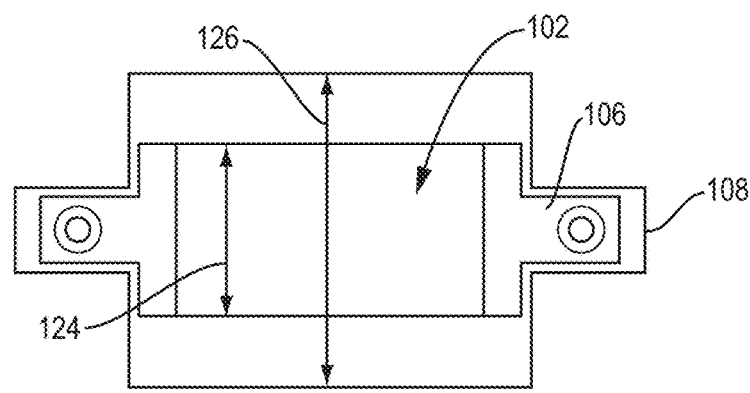
FIG. 5 is a diagrammatic top view of an exemplary heating element assembly of a thermally driven actuator system having a shortened configuration according to some embodiments of the present disclosure.

FIGS. 3-5 show some embodiments of different configurations of the heating element assembly 100, including a cross-like configuration of FIG. 3, an angled or diagonal configuration of FIG. 4, and a shortened configuration of FIG. 5. In the cross-like configuration of FIG. 3, the heating element 102 includes a first extension 118 and a second extension 120 that are oriented substantially perpendicular to each other and extend along the same plane. In the angled or diagonal configuration of FIG. 4, the two edges of the heating element 102 are angled relative to the ends by an angle 122 of less than ninety degrees (e.g., between about 30° to about 85°). In the shortened configuration of FIG. 5, the width 124 of the heating element 102 is substantially smaller than the width 126 of the film adhesive 108, the dielectric layer 110, or the thermal insulation 114. In some embodiments, depending on the desired reconfigurations of the thermally driven element, an appropriately configured heating element can be used to generate the heating pattern for actuating the regions of the thermally driven element resulting in the desired reconfiguration. Thus, a variety of configurations of the heating element can be used. In some embodiments, the different configurations of the heating element assembly 100 can benefit aeronautical and/or aerodynamic features of a structure. One of ordinary skill in the art in view of the present disclosure will understand that other configurations of the heating assembly also fall within the scope of the invention.

In some embodiments, one or more electrode arrays are used to deliver power to one or more heating elements or to deliver power to one or more zones within a heating element. In some embodiments, one or more electrode arrays are used to connect with one or more sensors or transducers of the system.

In some embodiments employing one or more CNT network sheets including multiple different heating zones, one or more electrode arrays are employed to deliver power to the various zones for heating. In some embodiments, one or more electrode arrays are employed for detection of damage in the CNT sheet via changes in intrinsic resistance. In various embodiments, the one or more electrodes arrays for damage detection can be the same as or different than the one or more electrode arrays for supplying power for heating.

In some embodiments, the one or more electrode arrays could be implemented using one or more flex circuits (e.g., with metal, CNT or conductive composite traces). In some embodiments, the one or more electrode arrays are formed as traces using a direct-write technique. In some embodiments, the one or more electrode arrays are formed using externally applied contacts. In some embodiments, the one or more electrode arrays may be formed using a plurality of traces or layers, for example, wherein the traces are woven or braided.

In some embodiments employing a CNT network, one or more electrode arrays may define a plurality of electrode pairs across the CNT network. In some embodiments, each zone of the CNT network may have a corresponding electrode pair in the plurality of electrode pairs. In some embodiments, a pair of electrode arrays are positioned on opposite faces of a CNT network sheet. For example, in some embodiments, a first electrode array includes a plurality of "active" electrode columns and a second electrode array on an opposite face of the CNT network sheet includes a plurality of "passive" (i.e., grounded) electrode rows. In some embodiments, the columns and rows are each coupled by a multiplexing switch. By selecting particular column/row electrode pairs, using the multiplexer switch, power can be delivered to particular zones for heating particular zones. Alternatively or additionally, measurements such as intrinsic resistance, may be obtained for each zone using the multiplexer switch. In some embodiments, a plurality of "active" electrodes may be aligned in rows and a plurality of "passive" (i.e., grounded) electrodes may be aligned in columns.

Figure 20:
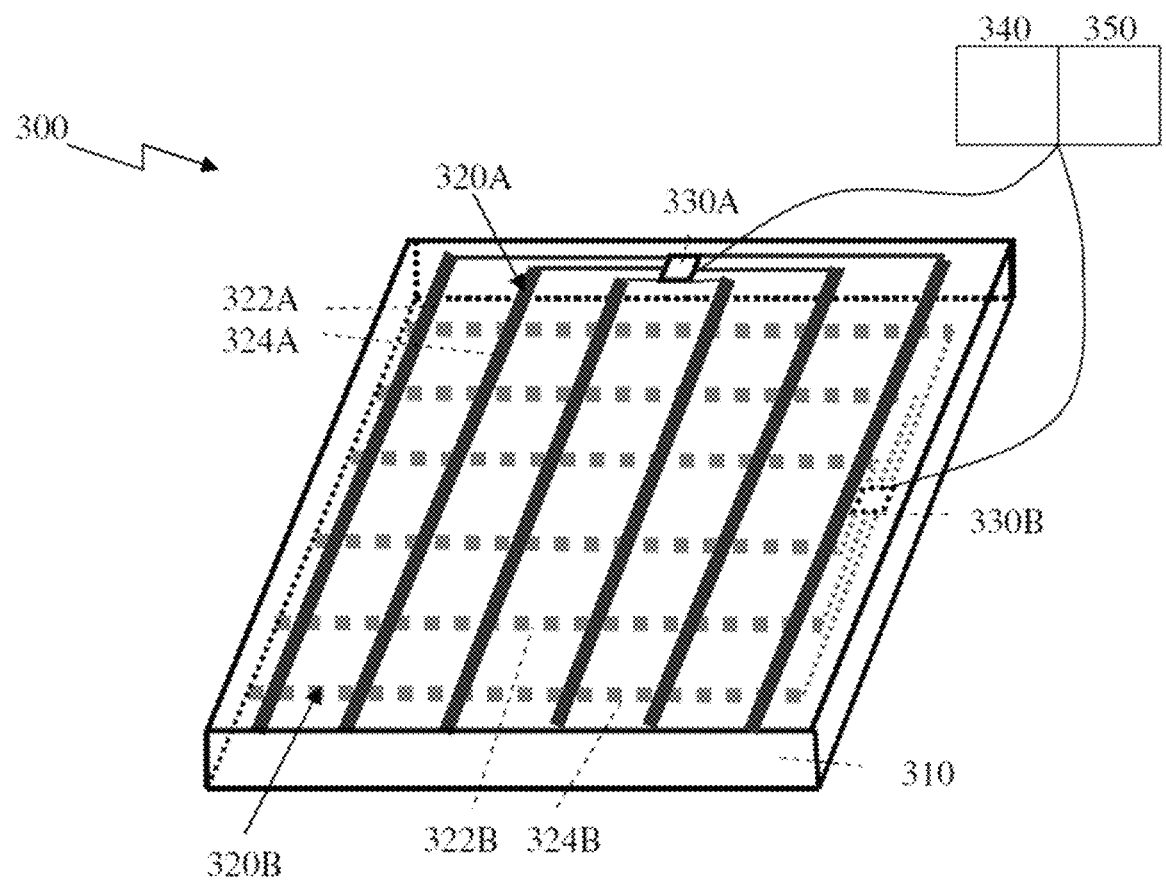
FIG. 20 diagrammatically depicts a CNT network based heating element including multiple heating zones and associated electrode arrays in accordance with some embodiments.

FIG. 20 depicts a system 300 including heating element 310 with multiple individually addressable heating zones. The heating element 310 includes a CNT network.

In general, system 300 may include one or more electrodes operationally coupled relative to the CNT network, for example for applying power to heat a portion of the CNT network and/or for detecting an electrical signal across the network. In exemplary embodiments system 300 may include one or more one or more electrode arrays defining a plurality of electrode pairs across the CNT network. In some embodiments, at least some of the electrode pairs correspond to zones of the heating element. In some embodiments, the electrode pairs may advantageously define a grid across the CNT network. In exemplary embodiments, point wise stepping may be used to select and cycle through each of the electrode pairs. In other embodiments, a multiplexing switch may be used to combine measurements from a plurality of electrode pairs or to apply power to heat multiple different electrode pairs.

As depicted in FIG. 20, the system 300 includes pair of electrode arrays 320A and 320B positioned on opposite sides of the structured CNT network wherein one of the electrode arrays 320A includes a plurality of "active" electrode columns (for example, columns 322A and 324A) and the other electrode array 320B includes a plurality of "passive" (i.e., grounded) electrode rows (for example rows 322B and 324B). The columns and rows are each coupled by a multiplexing switch 330A or 330B. The electrode columns and rows advantageously define a grid, wherein each column/row electrode pair defines a point on the grid. Power can be applied to selected column row pairs for heating, which may correspond to heating zones, using the multiplexing switch. By selecting and cycling through column/row electrode pairs, measurements, including intrinsic resistance measurements for CNT network damage detection or spatial data, may be obtained for each of the grid points. It is also noted that in-plane data may also be obtained, for example by selecting a pair of column electrodes or a pair of row electrodes for measurement. In some embodiments, a plurality of "active" electrodes may be aligned in rows and a plurality of "passive" (i.e., grounded) electrodes may be aligned in columns.

In exemplary embodiments, the electrode arrays 320A and 320B may be used to couple the CNT network to a control system 350 and/or a detection system 340 which may be implemented in whole or in part using a computing environment, or processor as described herein. In some embodiments, the control system 350 may be used to power, for example, induce a voltage or current across, one or more electrode pairs, for example to generate heat in one or more selected zones corresponding to one or more electrode pairs.

In some embodiments the detection system 340 may be used to detect electrical conductivity/resistivity across one or more electrode pairs. In other embodiments the detection system 340 may be used to detect an electrical signal across the one or more electrode pairs. In exemplary embodiments, the detection system 340 may be configured and/or programmed to detect a change in a physical property or characteristic of the heating element 310. In some embodiments the change in the physical property or characteristic of the heating element 310 may be determined by detecting a change in electrical conductivity/resistivity across the CNT network, (for example across, one or more electrode pairs). The changes in conductivity/resistivity may be on account of changes in the CNT network structure (for example, due to damage to heating element 310) or on account of a piezoresistive response of the CNT network structure (for example, due to propagation of a mechanical wave, a change of shape of the heating element 310, or structural damage to the heating element 310).

In exemplary embodiments, the physical property or characteristic of the heating element 310 may be related to the structural health of the heating element 310. Thus, for example, damage to the heating element 310 may be detected based on a detected change in conductivity/resistivity. Using a plurality of electrode pairs, for example, the electrode grid described above, spatial data for the damage may also be determined, for example relating to one or more of location, size, shape and distribution of the damage.

In other exemplary embodiments, the physical property or characteristic of the heating element may be related to the shape of the heating element 310. Thus, for example, a change to the shape of the heating element 310 may be detected based on a detected change in conductivity/resistivity. More particularly, a change in shape of the heater 310 (e.g., due to a change in the shape of the thermally driven element to which the heater is attached) can cause a piezoresistive response which results in the change in conductivity/resistivity. This may be particularly useful for applications where the shape of the heater 310 changes due to a change in the shape of the thermally driven element. In particular, the detection system 340 may provide useful feedback, to facilitate configuring the shape of the heating element 310.

Figure 21:
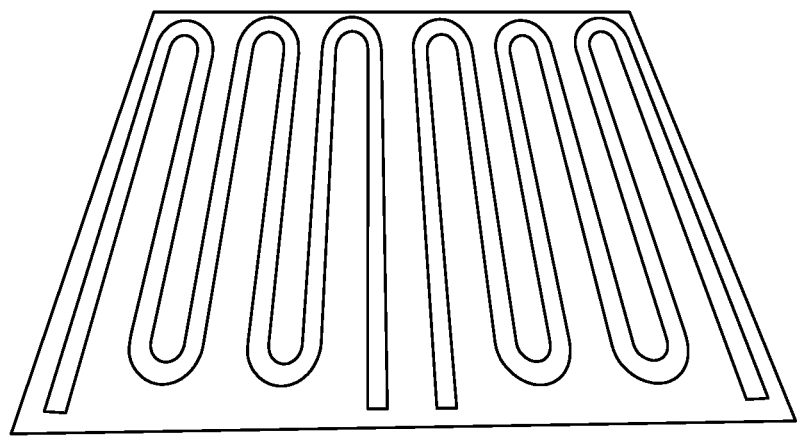
FIG. 21 depicts direct writing traces for an electrode array produced using a plasma flame spray in accordance with some embodiments.
Figure 22:
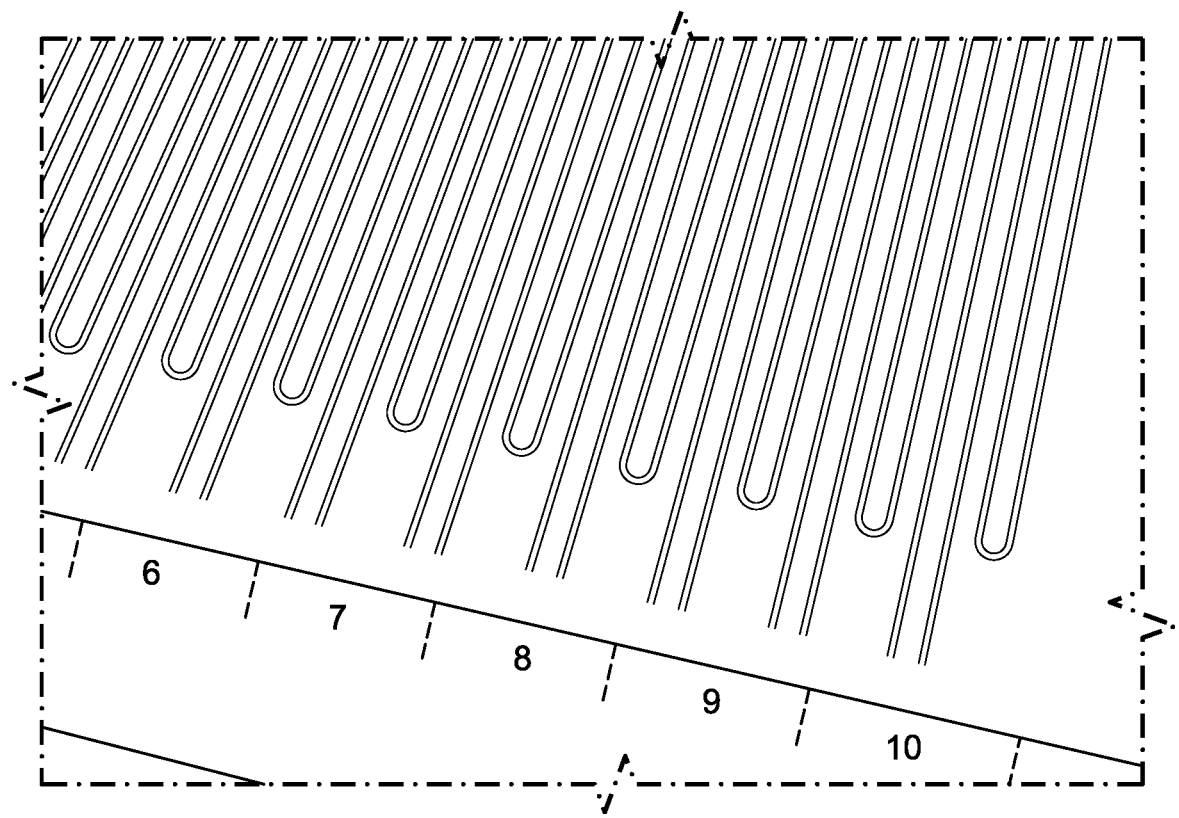
FIG. 22 depicts an image of direct writing traces for an electrode array produced using jetted atomized deposition in accordance with some embodiments.

In exemplary embodiments, the electrode arrays 320A and 320B may be advantageously formed using a direct-write (DW) technique with a conductive material, for example, silver, onto a surface of the object 310. FIGS. 21 and 22 illustrate examples of DW traces. More particularly, FIG. 21 depicts exemplary DW traces produced using a plasma flame spray (see U.S. Pat. No. 5,278,442) where copper or ceramic materials are electrically liquefied to be placed on the structure. FIG. 22 depicts exemplary DW traces produced using jetted atomized deposition (see U.S. Pat. No. 7,270,844) where silver or UV-curable epoxy are placed on a structure like an ink-jet printer and subsequently hardened. DW technology advantageously enables a high level of electro-mechanical integration and facilitates coupling electrodes to a structured CNT network, particularly, where interconnection problems would otherwise exist (for example, in the absence of a free edge).

Figure 23:
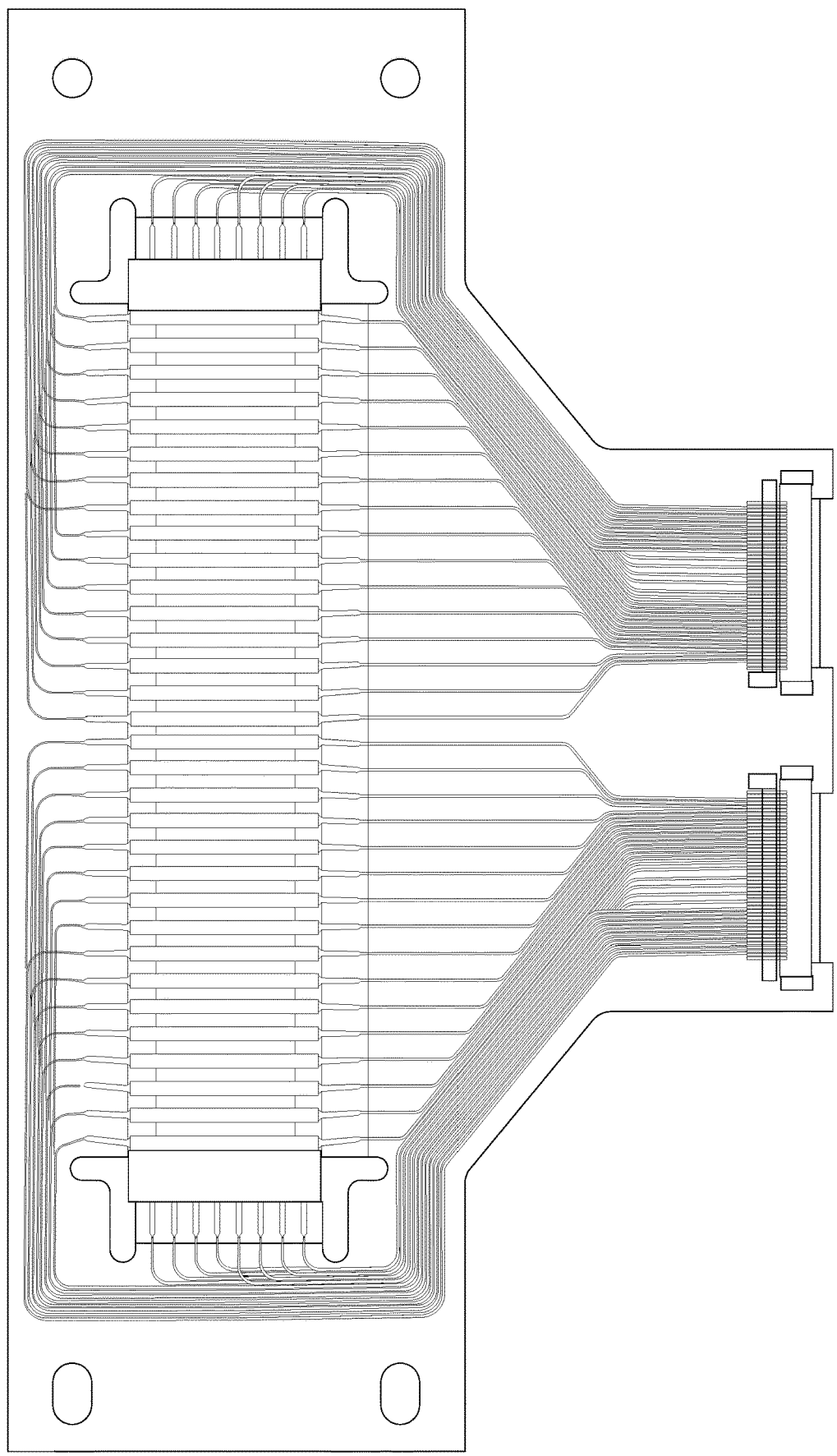
FIG. 23 depicts an exemplary flexible frame for connecting to traces in accordance with some embodiments.

Modifications to DW techniques are also possible. For example, a silk-screening process may be improved to reduce trace resistance variability and improve measurement accuracy. In some embodiments, a chemical etched template may be used to apply a trace pattern with better precision. In other embodiments, the number of traces (or electrodes) may be increased in order to increase spatial resolution (for example 32 horizontal (electrode rows) and 8 vertical (electrode columns). In exemplary embodiments, double-sided copper-coated-KAPTON (with coverlay) flexible circuit may be used to make connections with the DW traces (as opposed to soldered wire connections). The flexible circuit may be bonded first to the heating element and then the DW traces applied, including overwriting of the flexible circuit (which may, advantageously, include alignment marks). In exemplary embodiments, a urethane coating may be applied to prevent oxidation. In some embodiments, the flexible circuit may be configured in the shape of a rectangular frame, for example, with flaps on all 4 inside edges including exposed pads for the DW process. The object can fit inside the frame window with the top and bottom flap overlapping onto the front of the FFRP, and the left and right flap overlapping on the back of the FFRP. Traces can then be routed along the edges of the frame to an 80 pin ZIF connector located on a bottom tab for hardware connection. FIG. 23 depicts an exemplary flexible frame, according to the present disclosure. The exemplary flexible frame may provide enhanced electrical continuity (greater reliability, durability and consistency) between traces and a detection or control system, specifically because it can mitigate contract resistance issues.

As described herein a printed circuit board (PCB) or a flexible printed circuit board may be configured to couple, e.g., with the flexible frame of FIG. 23. The PCB may advantageously include multiplexing switches, e.g., for multiplexing a plurality of channels (trace electrode pairs). The PCB may further be configured to couple with data acquisition hardware, a processor or computing environment. In some embodiments hardware, firmware and/or software may be implemented to automate aspects of the methods of using the thermally driven actuation system (for example, to automate selection of channels for selectively heating zones and/or data acquisition). In exemplary embodiments, automating hardware may connect directly to the flexible frame, for example, via a mating surface mount technology (SMT) header connector, and to a PC, for example, via a RS-232 connection. In some embodiments, dual multiplexer banks may be implemented to select an appropriate trace pair for power delivery for heating or for measurement or sensing. For testing for intrinsic resistance changes, a constant current may then be applied through the trace pair and voltage (for example, 16-bit voltage) measured. Conductivity/resistivity may then be derived (note that resistance is directly related to voltage over current).

Figure 6A:
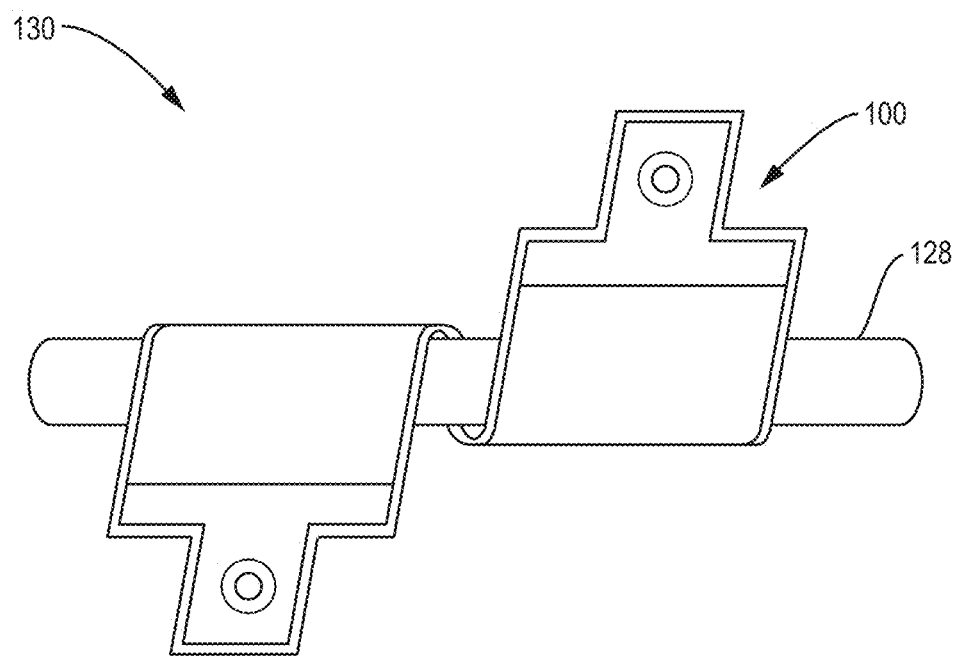
FIG. 6A is a diagrammatic view of an exemplary heating element assembly wrapped around a thermally driven element in a non-activated configuration according to some embodiments of the present disclosure.
Figure 6B:
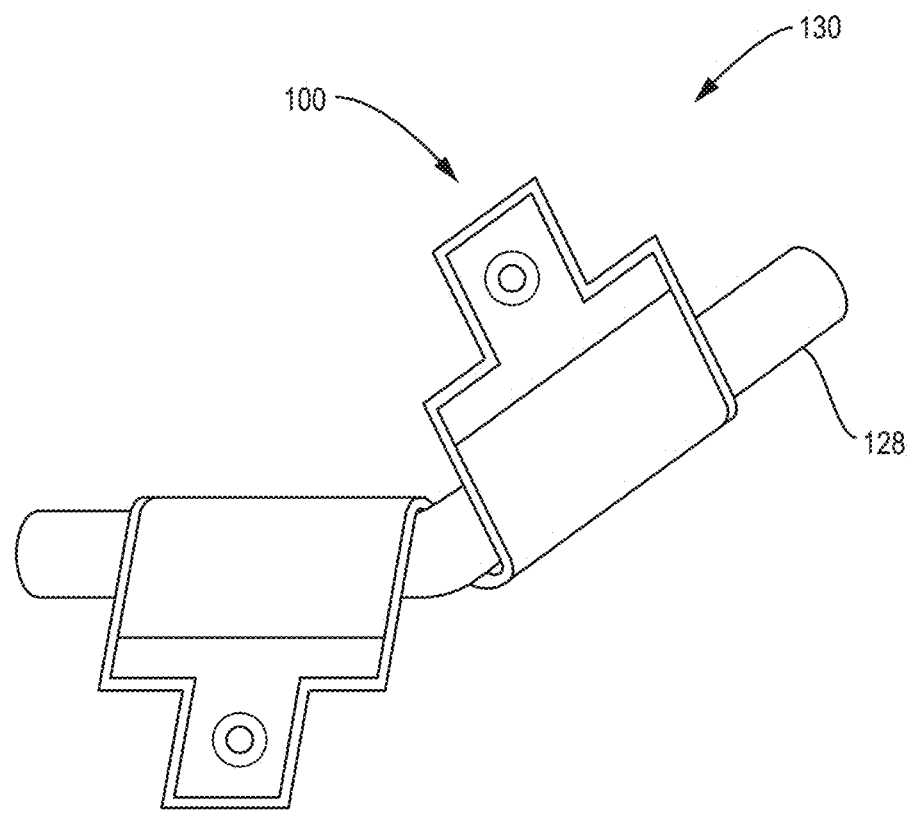
FIG. 6B is a diagrammatic view of the exemplary heating element assembly wrapped around the thermally driven element of FIG. 6A in an activated configuration.

Turning back to the single zone heating element assembly 100, FIGS. 6A and 6B are diagrammatic views of the heating element assembly 100 coupled to and in thermal contact with a thermally driven element 128 in a non-activated position (FIG. 6A) and an activated position (FIG. 6B). In combination, the heating element assembly 100 and the thermally driven element 128 are referred to herein as a thermally driven actuator system 130 (hereinafter "system 130"). As discussed herein, the thermally driven element can include, e.g., one or more shape memory materials, one or more materials that exhibit a substantial change in dimension upon the application of heat, any material capable of significant temperature proportional displacement, combinations thereof, or the like. In some embodiments, the thermally driven element 128 includes one or more of a shape memory alloy, a shape memory polymer, and a liquid crystal elastomer. In embodiments where the thermally driven element 128 includes two or more of a shape memory alloy (SMA), a shape memory polymer, and a liquid crystal elastomer, the thermally driven element may be referred to as a hybrid thermally driven element. In some embodiments, a hybrid thermally driven element 128 includes a shape memory alloy, a shape memory polymer, and a liquid crystal elastomer. In some embodiments, a hybrid thermally driven element 128 includes a shape memory material (e.g., a shape memory alloy, a shape memory polymer) and a material that exhibits a proportional and significant change in dimension with change in temperature (e.g., a liquid crystal elastomer).

In some embodiments, the hybrid thermally driven element 128 includes one or more types of thermally driven materials (e.g., a combination of two or more shape memory alloys (a combination of NITINOL® fibers with a shape memory polymer matrix), a combination of a shape memory alloy and a shape memory polymer, a combination of a shape memory alloy, and a liquid crystal elastomer, or the like).

In some embodiments, the SMA includes one or more of a copper-aluminum-nickel alloy, a nickel-titanium alloy, alloyed zinc, alloyed copper, or the like. In some embodiments, the SMA includes NITINOL®, although alternative SMA can be used. In some embodiments, the shape memory polymer includes one or more of polyurethane, polyester, polyketone, or the like. In some embodiments, the liquid crystal elastomer includes one or more of monodomain, polydomain, or the like. In some embodiments, a material or materials of the thermally driven element 128 are selected to have high thermal expansion rates.

In some embodiments, the thermally driven element 128 can be formed into a sheet-like configuration. In some embodiments, the thermally driven element 128 can be in the form of a composite of memory alloy fibers. In some embodiments, the thermally driven element 128 can be in the form of multiple layers coupled to each other.

The materials of the thermally driven element 128 can be selected to provide sufficient resistance to external forces, while flexible enough to allow for bending when heating to a predetermined temperature. In some embodiments, the materials of the thermally driven element 128 can be selected based on the operational temperature, mechanical limitations, or forces expected to be imparted on the shape material element or structural element. For example, the hybrid composition of the shape memory alloy, the shape memory polymer, and the liquid crystal elastomer (e.g., the percentages of each) can be selected based on the strength, rigidity and/or stiffness desired for operation.

Although shown in FIGS. 6A and 6B in a substantially cylindrical or rod-like configuration, it should be understood that the thermally driven element 128 can be formed into any shape. For example, the thermally driven element 128 can be in a substantially flat configuration, a curved configuration in the non-activated position, combinations thereof, or the like. In some embodiments, the thermally driven element can be formed into a sheet-like or substantially flat configuration.

FIG. 6A shows the thermally driven element 128 in a non-activated or non-actuated state prior to heating of the heating element assembly 100. Upon heating of the heating element 102, the heat can be transferred to the thermally driven element 128, resulting in activation and reconfiguration of the thermally driven element 128 from the linear rod to an angled rod. FIG. 6B shows the thermally driven element 128 in the angled configuration due to the activated heating element 102.

Figure 7:
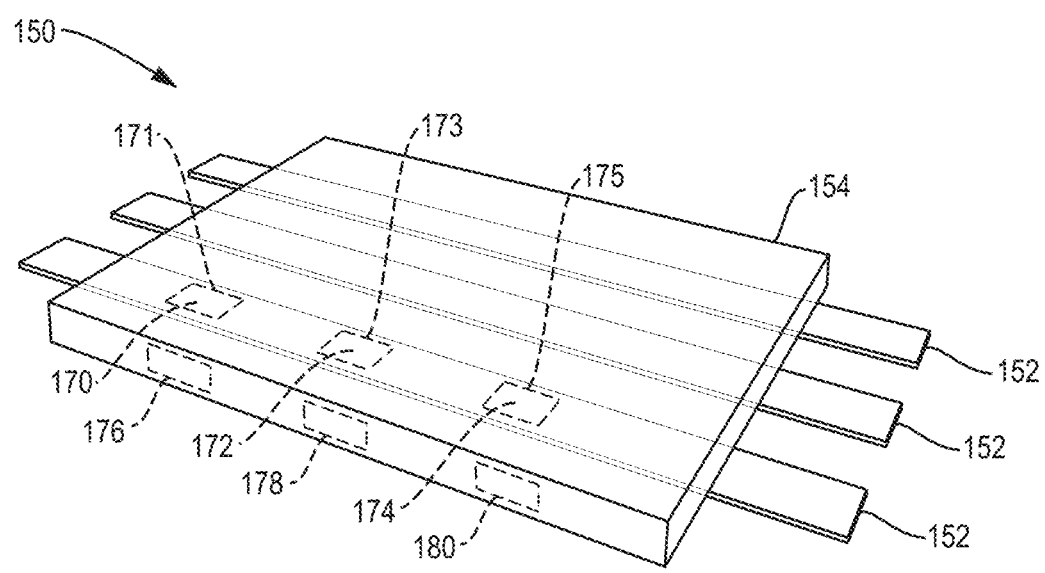
FIG. 7 is a diagrammatic view of an exemplary thermally driven actuator system according to some embodiments of the present disclosure.
Figure 8:
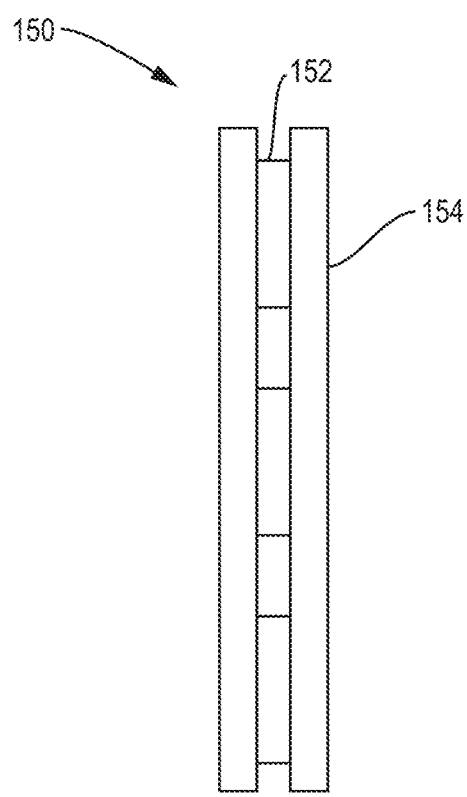
FIG. 8 is a diagrammatic, cross-sectional view of the exemplary thermally driven actuator system of FIG. 7.

FIGS. 7 and 8 are diagrammatic perspective and cross-sectional views of a thermally driven actuator system 150 (hereinafter "system 150"). The system 150 includes multiple thermally driven elements 152 in the form of elongated strips extending substantially parallel to each other and one or more heating elements 154 (e.g., including one or more CNT networks), which are depicted here in the form of a sheet 154 including multiple heating zones. Each of the thermally driven elements 152 can include different regions arranged longitudinally and/or laterally along the length and width of the thermally driven element 152 where each region corresponds with a respective zone of the heating element or with a corresponding heating element. For example, the heating element 154 can include multiple zones 171, 173, 175 capable of being independently heated. A person of ordinary skill in the art would understand that the zones 171, 173, 175 can each be electrically electrically connected to a respective electrode or electrodes (e.g., similar to electrode 106 or by employing an electrode array (not shown)). In some embodiments, each zone is spatially separated from other zones. Although shown as only three zones 171, 173, 175 corresponding with regions of one of the thermally driven elements 152, it should be understood that the heating element 154 can include more or fewer zone, and can employ similar zones corresponding with multiple regions of each of the thermally driven elements 152.

As described above, in some embodiments, the heating element 154 is in the form of a sheet having multiple segmented or zones 171, 173, 175 in which each zone 171, 173, 175 can be independently and selectively heated without affecting the temperature of the adjacent zones 171, 173, 175. In some embodiments, each zone is implemented using a separate heating element. The zones 171, 173, 175 enable controlled and customizable temperature or heating patterns to be applied by the heating element 154. Particularly, the independent control of which zone or zones 171, 173, 175 being heated and the amount of heat applied at each zone 171, 173, 175 enable for multiple different patterns of heating applied by the heating element 154, and is referred to herein as a variable or customizable pattern of heating.

Thus, rather than heating the entire heating element 154 to a single, substantially temperature, each of the zones 171, 173, 175 can be independently heated (or not heated) to different (or the same) temperature. In embodiments employing a heating element for each zone, each heating element can be independently heated or not heated to a different (or the same) temperature. Each zone 171, 173, 175 can correspond to a specific region of the thermally driven element 152 coupled against the heating element 154 such that specific regions of the thermally driven element 152 can be selectively and independently heated via the zones 171, 173, 175. By individually controlling the heat to each of the specific regions in the desired pattern, the individual regions can be reconfigured to achieve the net shape desired for operation. The zones 171, 173, 175 and predetermined pattern of heating applied by the heating element 154 enable the thermally driven element 152 to be reconfigured into multiple customizable shapes having a variety of configurations.

As an example, zone 171 of the heating element 154 can be heated to only activate and reconfigure one region of the leftmost thermally driven element 152. Thus, rather than reconfiguring all three thermally driven elements 152 or the entire shape of the leftmost thermally driven element 152, specific regions can be reconfigured based on the pattern of heating applied by the heating element 154. As a further example, zones 171, 175 can be activated by the heating element 154 while zone 173 is not activated, thereby reconfiguring two spaced regions of the leftmost thermally driven element 152. The amount of activation or reconfiguration of the thermally driven element 152 can depend on the amount of heat applied by the heating element 102 and the length of time in which the heat is applied.

For example, predetermined temperatures (or temperature ranges) can result in specific changes in the thermally driven element 152. Thus, regulated heating can be applied to the thermally driven element 152 at one or more regions to achieve the desired reconfiguration and shape of the thermally driven element 152. Although discussed as a bending reaction, it should be understood that the thermally driven element 152 can undergo linear actuation, bending actuation, torsional actuation, or combinations thereof based on the specific heating pattern applied by the heating element 154.

The one or more heating elements 154 are disposed on one or more sides of the thermally driven elements 152 (e.g., sandwiching the thermally driven elements 152). In some embodiments, thermally driven elements 152 pass through or between the heating elements 154, and heat supplied by the heating elements 154 transfers to the thermally driven elements 152 to selectively reconfigure the thermally driven elements 152. In some embodiments, the system 150 includes one or more sensors 170, 172, 176, 178 coupled to the thermally driven element 152 and/or the heating element 154. In some embodiments, each of the sensors 170, 172, 176, 178 produces temperature signal regarding the detected temperature of at least a portion of the thermally driven element 152 and/or the heating element 154. In some embodiments, each of the sensors 170, 172, 176, 178 is configured to transmit a temperature signal regarding the detected temperature of the heating element 154 or the region of the thermally driven element 152 to a controller. In some embodiments, the system 150 can include one or more transducers 174, 180 coupled to the thermally driven element 152 and/or the heating element 154. In some embodiments, the system 150 is attached to a structural member (not shown) and the one or more transducers are coupled to at least a portion of the structural member. The one or more transducers 174, 180 are configured to generate or produce one or more signals related to a position or a deflection of at least a portion of the thermally driven element 152, the heating element 154, and/or the structural member (not shown). In some embodiments, each transducer 174, 180 is configured to transmit a signal or signals to a controller regarding a position or deflection of at least a portion of the thermally driven element 152, the heating element 154, and/or the structural member (not shown).

Figure 9:
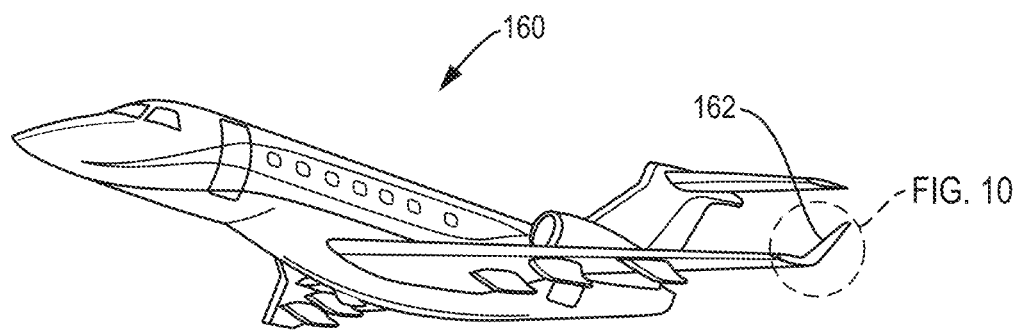
FIG. 9 is a diagrammatic view of an aircraft including an exemplary thermally driven actuator system according to some embodiments of the present disclosure.
Figure 10:
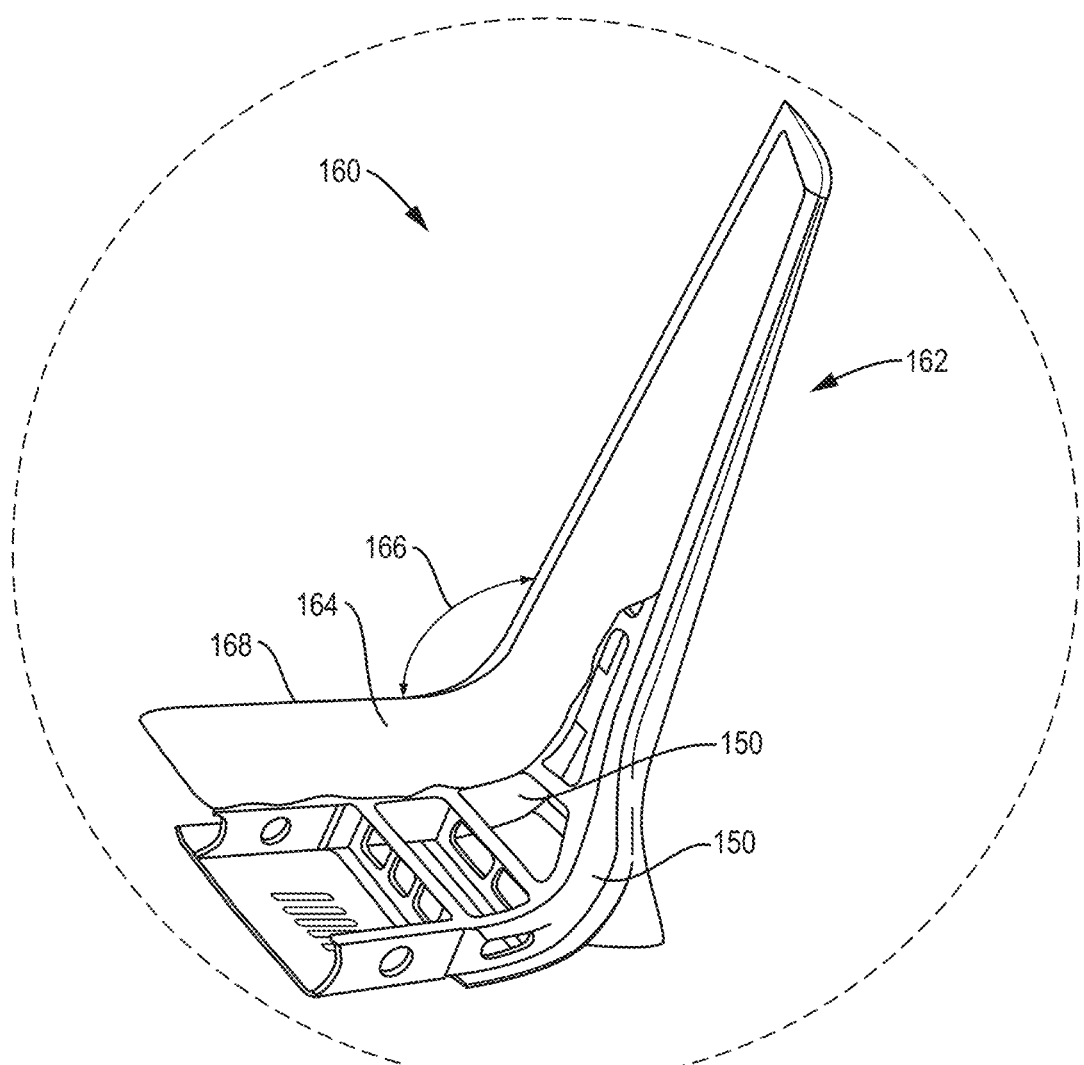
FIG. 10 is a diagrammatic, detailed view of a wingtip of the aircraft of FIG. 9.

FIGS. 9 and 10 are diagrammatic perspective and detailed views of an aircraft 160 including the system 150. In some embodiments, the thermally driven element discussed herein can be coupled to or incorporated into a structural element such that reconfiguration of the thermally driven element results in reconfiguration or repositioning of the structural element. In some embodiments, the system 150 can be incorporated into one or more portions of a wingtip 162 of the aircraft 160, or any other structural components of the aircraft 160. For example, frames in the wingtip 162 corresponding to structural members can be coupled to or formed from the system 150 such that an angle 166 between the wingtip 162 and the wing 168 can be regulated based on heat applied to the thermally driven elements 152. In some embodiments, an outer housing 164 at a connection between the wingtip 162 and the wing 168 can be formed from a shape memory polymer such that the housing 164 can flex as needed during actuation of the system 150. In some embodiments, the outer housing 164 can include one or more of the sensors 170, 172, 176, 178 and/or transducers 174, 180 to detect the position or deflection of the structural element (e.g., the wing tip).

The exemplary systems discussed herein can be used for varying the shape of any type of structure. As noted above, in some embodiments, the exemplary systems can be used to vary the shape of one or more components associated with aircraft structures. Aircraft structures have always changed shape or aerodynamic configuration to some degree. For example, modern aircraft use retractable landing gear, and numerous configurations of discrete leading and wing sweep to control and optimize aerodynamic performance for a particular phase of flight. However, such positioning changing is traditionally performed through electrical and/or mechanical components. The exemplary systems can be incorporated into aircraft to provide for shape morphing structures that include lightweight powerful actuators or thermally driven materials. As described herein, thermally driven elements can be used to provide the actuation force for shape morphing the aircraft structures. By using CNT network heating elements that enable local heating and local morphing, some embodiments of the systems improve the degree of morphing and morphing versatility.

Additional uses of the exemplary systems include components of unmanned vehicles (e.g., unmanned aerial vehicles (UAVs), unmanned underwater vehicles (UUVs), unmanned surface vehicles (USVs), and unmanned land vehicles). Part of the versatility of unmanned vehicles is their ability to maneuver in ways not possible for manned vehicles. Most notably, conditions that otherwise would be impossible for human operators to survive. While it is possible to alleviate the stress to a human operator for some extreme conditions, such as pressure or temperature, others such as high shock or accelerations could incapacitate a human operator and potentially cause long term effects (ranging from concussions to death). Thus, while the opportunity exists for extremely maneuverable vehicles, it also creates the need to develop structural and mechanical components that can survive these unique environments.

The torsional/rotary actuators of the exemplary systems can be used for unmanned underwater and surface vessels. The actuators could be used to control angles on control surfaces to facilitate steering/maneuvering. The issue with conventional mechanical rotary actuators is that under the shock of a slap load (e.g., being hit by a large wave or falling into the sea after being lifted by a large wave) the metallic parts can fracture, yield (e.g., be bent into an undesirable position), or fatigue over multiple events. In some embodiments, the exemplary systems can be used as non-metallic torsional/rotary actuators that can provide the desired precision of actuation while being able to survive these large repeated shock events. Thus, the disclosed thermally driven materials can be used to make robust actuators that can tolerate high reaction forces during sea operation or any other harsh environment.

In some embodiments, electroactive polymers (EAPs) can be used as part of the actuators (e.g., thermally driven elements). EAPs are extremely flexible and can survive high strain and shock. However, EAPs have a low force resistance. Therefore, EAPs could potentially be combined with additional materials to form a hybrid thermally driven element for actuation. In some embodiments, one or more polymer-based thermally driven materials (e.g., thermoplastics) can be used to form the elements. Polymer-based thermally driven materials are generally much stiffer than EAPs and would be capable of withstanding higher loads. In some embodiments, such as a commercial aircraft applications, shape memory alloy wires (such as NITINOL®) can be combined with shape memory polymers to create hybrid thermally driven composites that have high strength and stiffness characteristics in order to resist the air (or water) flow that is being reacted upon for maneuvering. Some thermally driven materials can also be actuated and forced (e.g., shape memory materials) into two stable modes. For example, for some thermally driven materials while heating or power is needed to change positions or configurations, the reconfigured position could be stably held without the need to apply or hold power.

In some embodiments, the thermally driven element element includes a thermal shape memory material, such as a shape memory alloy or a thermal shape memory polymer, and a material that undergoes a more proportional change in dimension with temperature, such as a liquid crystal elastomer. In some such embodiments, the thermal shape memory material can be used to make a large or gross change in configuration by heating one or more a regions of the hybrid element to above a predetermined transition temperature associated with a phase change in the shape memory material, and then smaller (e.g., fine tuning) adjustments to the configuration can be made by changes to the temperature of the one or more regions of the hybrid element that still keep the temperature above the predetermined temperature. In some embodiments, a hybrid element includes multiple different shape memory materials, which may have different predetermined transition temperatures. For example, a hybrid element including both a shape memory alloy and a thermal shape memory polymer would have a predetermined transition temperature associated with each. In some embodiments where the hybrid element includes a first shape memory material and a second shape memory material, heating one or more regions of the hybrid element to above a first predetermined temperature associated with the first shape memory material would cause the hybrid element to transition to a first configuration and further heating of the same one or more regions of the hybrid element to above a second predetermined temperature associate with the second shape memory material would cause the hybrid element to transition to a second configuration.

Traditionally, SMAs were used with two positions that are controlled by a temperature driven phase change. However, for maneuvering applications, more positions are desired. Therefore, the exemplary systems can include a thermally driven element with multiple regions configured such that as each region is independently heated, each region can contribute a smaller rotation (e.g., between about 1° to about 5°) to the thermally driven element, which in turn add up to a larger angle as more and more regions are heated or excited. Independently heating each region can also allow for reconfiguration of elements into a variety of customizable shapes. The examples discussed below demonstrate linear actuation, and the same principals apply for rotational or torsional adjustments.

Because the actuation of the thermally driven element is triggered by heat, local heating in various regions enables the segmentation of the actuation of the thermally driven element. For example, an SMA wire trained to actuate at three different points along the wire results in three independently triggered positions. Experimentation was performed to test operation of the exemplary systems. Carbon nanotube network heaters capable of being fully integrated within a structure were prepared. The mechanism of heating resembles a Joule heating, and the temperature for the heater can be varied by increasing or decreasing the power applied. This enables not only targeting of local heating in the specific zones, but also reduces the weight associated with a heavy thermal setup. In some embodiments, the CNT network heating element can be co-cured to a composite laminate or bonded to a metallic part. Since CNT networks are extremely light (density of about 1.6 g/cm$^3$), a 2×2 cm$^2$ CNT network heating element weighs only about 1.5 g.

Figure 11:
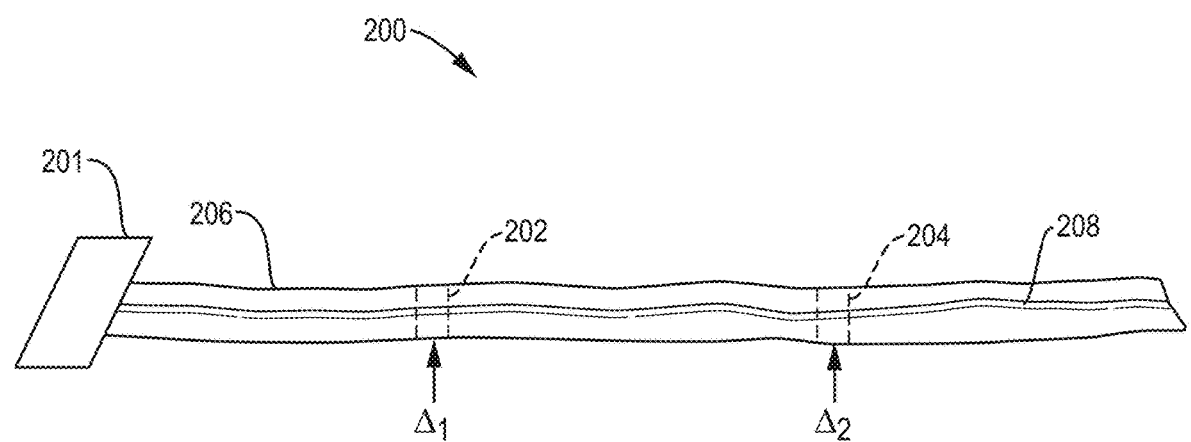
FIG. 11 is a perspective view of a fabricated example actuator including a thermally driven alloy, a copper beam, and two carbon nanotube (CNT) heating elements placed in two zones of the copper beam in accordance with an example embodiment of the present disclosure.

The experimentation performed indicated that CNT network heating elements provided enough heat to actuate a thermally driven element in the form of an SMA wire and a structural support in the form of a copper beam or a PEEK beam coupled to the SMA wire, and to target local actuation of a specific segment within the SMA wires corresponding to a specific portion of the copper or PEEK beam. As described below, the experimental embodiments included a thermally driven wire, specifically, a NITINOL® wire, bound to a copper sheet forming a beam and a thermally driven wire, specifically, a NITINOL® wire, embedded in a high strength polymeric matrix forming a beam. The experimentation demonstrated the segmental heating and actuation of a combination of NITINOL® and a copper beam, and NITINOL® and a PEEK beam. On the surface of each beam, at least two CNT network heating elements were placed strategically and co-cured on the beam, with each CNT network heating element corresponding to an independent heating zone for heating a different region of the NITINOL® wire. FIG. 11 is a perspective view of an example experimental setup 200 including two CNT network heating elements 202, 204 placed in two independent zones of a copper beam 206. The CNT network heating elements 202, 204 are located below the beam with their positions shown using dotted lines 202, 204. A copper sheet was chosen as the structural element used for demonstration purposes due to its flexibility and high thermal conductivity. One end of the copper beam 206 was fixed by a clamp 201. The materials and dimensions are detailed in Table 1 below.

TABLE 1

Materials and Properties

| | Material | Length (mm) | Width (mm) | Thickness (mm) | Radius (mm) |
|---|---|---|---|---|---|
| Beam | Copper | 160 | 10 | 0.1 | — |
| Actuator | NITINOL ® | 151 | — | — | 1 |

The desired shape was memorized by the SMA wire 208 through a training process. The procedure involved fixing the shape tightly using washer and bolts on a plate while heating the wire 208 at about 480° C. for at least 25 minutes and rapidly quenching the wire 208 in ice water. The example designed for the purpose of this study was programmed to have two different regions for actuation indicated as $\Delta_1$, which corresponded to heating element 202, and $\Delta_2$, which corresponded to heating element 204, as shown in FIG. 11.

Figure 12:
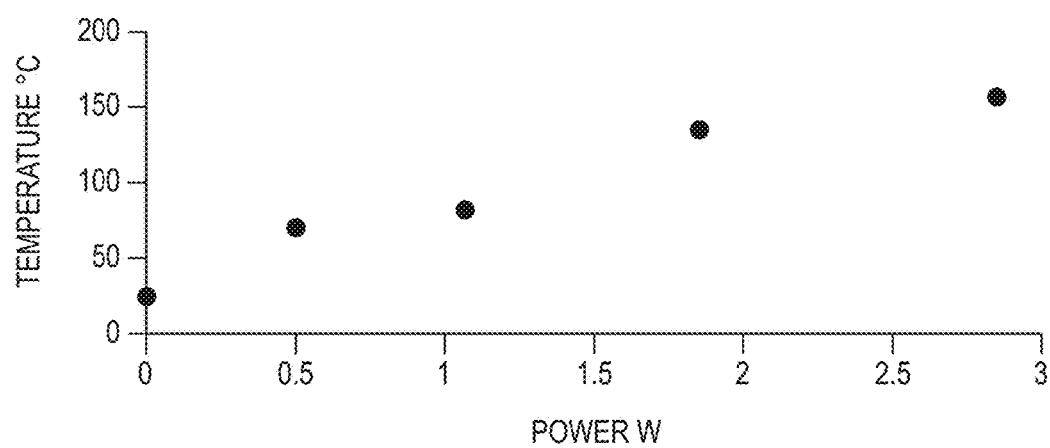
FIG. 12 is a chart of the temperature profile vs. power for a 0.5×0.2 cm$^2$ CNT heating element employed in the example embodiment depicted in FIG. 11.

The assembly of the CNT network heating elements 202, 204 on the SMA wire 208 and copper beam 206 was performed using thermally conductive epoxy adhesive that enabled effective heat transfer from the CNT network heating elements 202, 204 to the SMA wire 208. At low current (0.3 A), the 5×30 mm heating element reached about 130° C. at which point the SMA wire 208 was actuated, bending the copper beam 206. The temperature profile of one of the CNT network heating elements 202, 204 as a function of power was obtained to target the right Austenite transition in the SMA wire 208 (see FIG. 12). FIG. 12 shows that temperatures in the range of about 80° C. to about 160° C. are easily achievable at relatively low input power.

To trigger selective actuation, the CNT network heating elements 202, 204 were consecutively powered, and movement of the beam 206 was recorded as a function of time. FIGS. 13A-E show images of the copper beam actuation before and after heating elements 202, 204 were turned on and supplied with increasing amounts of power. FIG. 13A shows the assembly prior to actuation. As heating element 202 was turned on (power (P)=2 W), the beam 206 was reconfigured by an angle of about 10 degrees after about 20 seconds (FIG. 13B). Increasing the temperature to about 160° C. by increasing the power through the heating element 202 to P=3.5 W, resulted in a maximum actuation angle of about 18 degrees (FIG. 13C). A similar effect was observed when heating element 204 was turned on. At P=2 W, the beam 206 was actuated and reconfigured to an angle of about 15 degrees, but reached about 46 degrees at P=3.5 W (FIG. 13D).

It should be noted that heating element 202, which heats a first region of the wire 208 corresponding to region $\Delta_1$ for actuation of the beam 206 does not actuate region $\Delta_2$ of the beam 206. Similarly, heating element 204, which heats a second region of the wire 208 corresponding region $\Delta_2$ for actuation of the beam 206 does not actuate region $\Delta_2$ of the beam 206. Thus, heating element 202 actuated only region $\Delta_1$ of the beam 206 and heating element 204 actuated only region $\Delta_2$ of the beam 206. Implementing two different zones for heating corresponding to two different regions of the wire 208 and two different corresponding regions of the beam 206 resulted in a sharper deformation than using only zone one. Finally, when both heating elements 202, 204 were turned off, the beam 206 returned back slowly to its original position (FIG. 13E). Table 2 summarizes the actuation angles observed in the different heating element zones and corresponding beam actuation regions and the effect of the applied power on the actuation angle.

TABLE 2

Segmental Actuation of SMA/Copper Beam

| Current (A) | Power (W) | Temp. (° C.) | Heating Element 1 (angle after 20 sec) | Heating Element 2 (angle after 20 sec) |
|---|---|---|---|---|
| 0.2 | 1 | 82 | 5° | 7° |
| 0.3 | 2 | 135 | 10° | 15° |
| 0.4 | 3.5 | 160 | 18° | 46° |
| 0-heat off | 0 | 30 | 3° | 10° |

Figure 14:
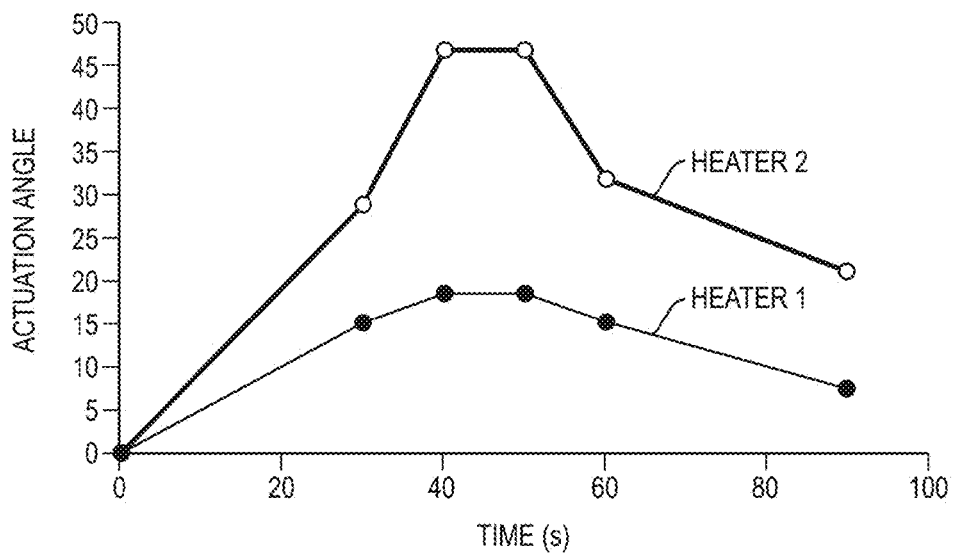
FIG. 14 is a graph of an actuation angle versus time for deformation of a thermally driven alloy and copper beam during heating with constant power applied to two different heating elements located at different positions along the beam.

The effect of obtaining larger angles for higher power is equivalent to leaving the SMA wire 208 actuated during longer dwell time. SMAs are known to be slowly responsive. SMAs provide a high actuation force due to the high modulus of the SMA in Austenite phase (90 GPa), but the crystalline transition can be slow. FIG. 14 shows the evolution of the actuation angle when heating elements 202, 204 were powered to about 0.3 W. The maximum actuation angles were reached after about 40 seconds. At about 50 seconds, power to the heating elements 202, 204 was switched off, resulting in a gradual decrease of the actuation angle.

Figure 15:
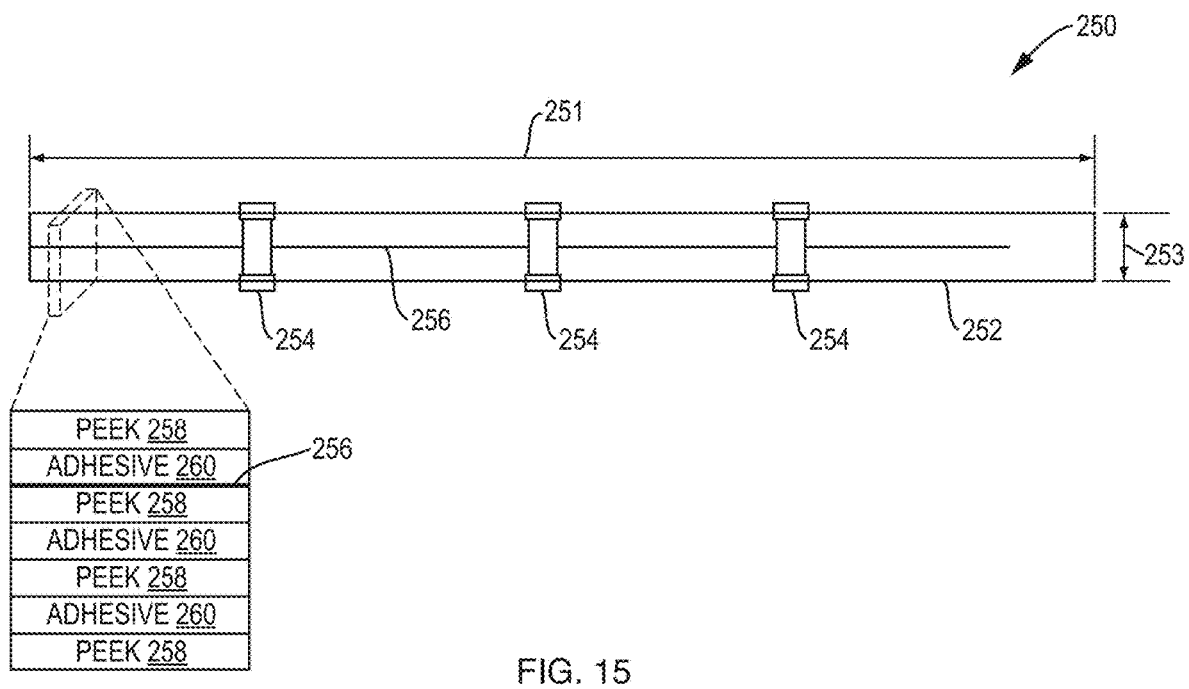
FIG. 15 is a diagrammatic view of an exemplary thermally driven actuator system including polyetheretherketone (PEEK) layers and a detail view in accordance with some embodiments.
Figure 16:
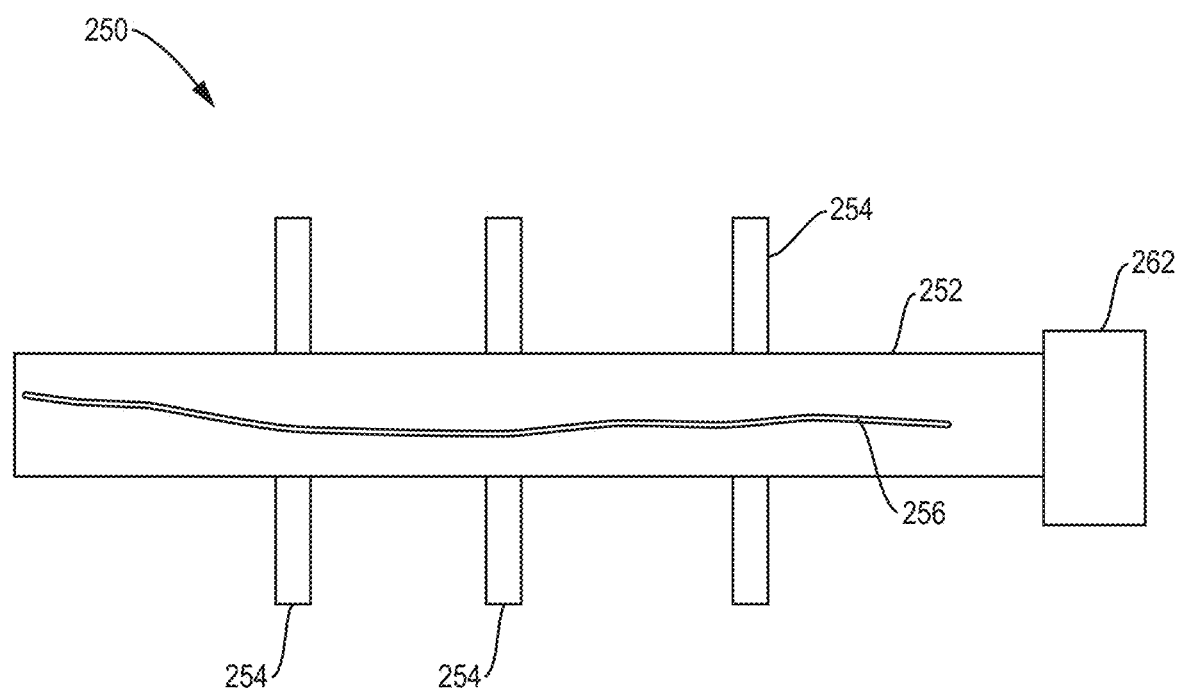
FIG. 16 is an example PEEK and thermally driven alloy beam in accordance with an example embodiment.

FIGS. 15 and 16 are diagrammatic and perspective views of an experimental thermally driven actuator system 250 including a composite thermally driven element 252, which includes PEEK layers as an integrated structural element, and three different CNT network heating elements 254 each disposed at a different zone along the composite thermally driven element 252. The thermally driven element 252 has a length 251 and a width 253. The thermally driven composite beam or element 252 was fabricated by sandwiching a NITINOL® wire 256 in a 4 ply PEEK laminate. As shown in the cross-sectional representation in FIG. 15, the element 252 included the wire 256, a PEEK layer 258 coupled to the top of the wire 256 with adhesive 260, and a laminate of PEEK layers 258 coupled together and to the bottom of the wire 256 with adhesive 260. The thickness of the beam was about 500 µm. As shown in the cross-sectional representation in FIG. 15, the SMA wire 256 was placed at about one-quarter of the composite thickness in order to maximize the degree of actuation. The three CNT network heating elements 254 were each co-cured at the respective active location along the SMA wire 256. The element 252 (beam) was cured in a vacuum bag for about two hours at about 180° C. A clamp 262 was used to secure one end of the element 252 for testing (FIG. 16).

Figure 17A:
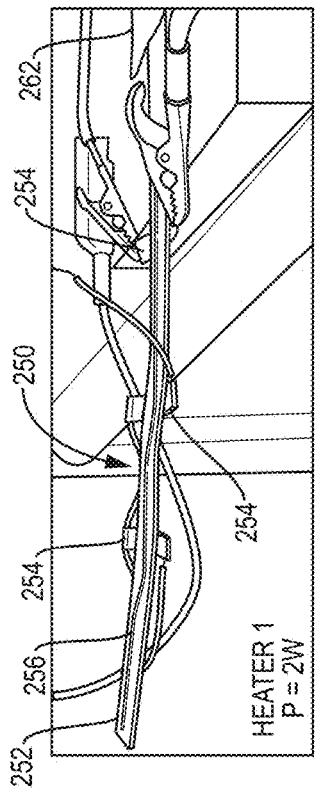
FIG. 17A shows the PEEK and thermally driven alloy beam of FIG. 16 prior to segmental actuation with selective heating in multiple zones employed in an example embodiment of the present disclosure.
Figure 17B:
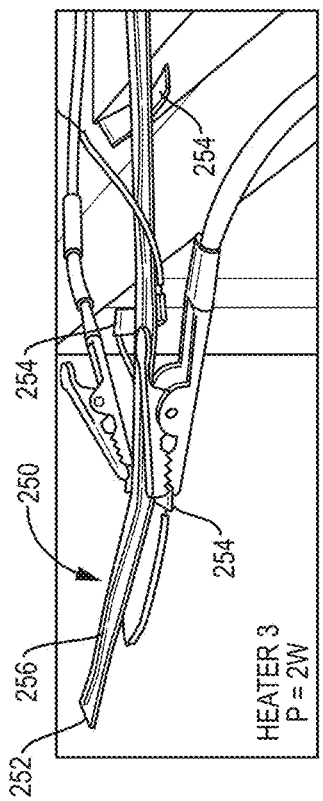
FIG. 17B shows segmental actuation of the PEEK and thermally driven alloy beam of FIG. 16 using selective heating in zone one at a power P=2 W employed in an example embodiment of the present disclosure.
Figure 17C:
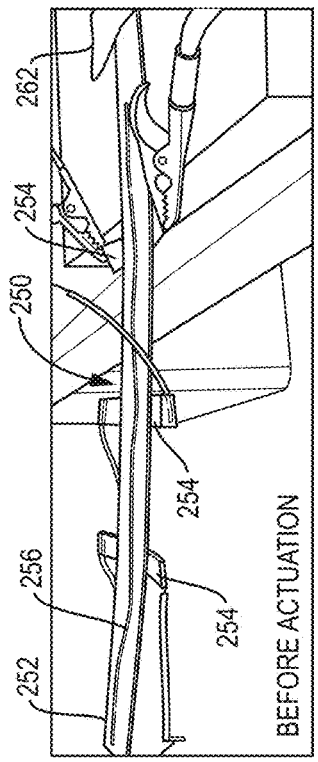
FIG. 17C shows segmental actuation of the PEEK and thermally driven alloy beam of FIG. 16 using selective heating in zone two at a power P=2 W employed in an example embodiment of the present disclosure.
Figure 17D:
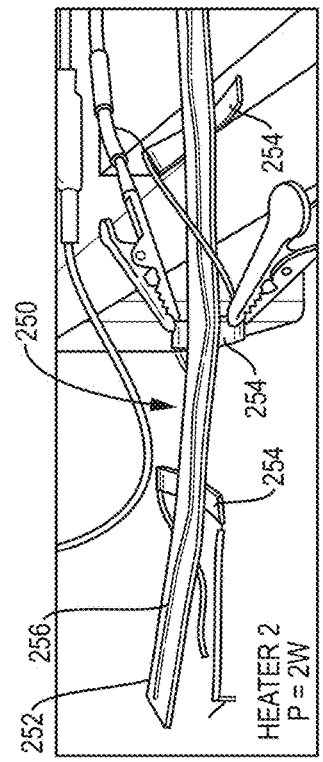
FIG. 17D shows segmental actuation of the PEEK and thermally driven alloy beam of FIG. 16 using selective heating in zone three at a power P=2 W employed in an example embodiment of the present disclosure.
Figure 17E:
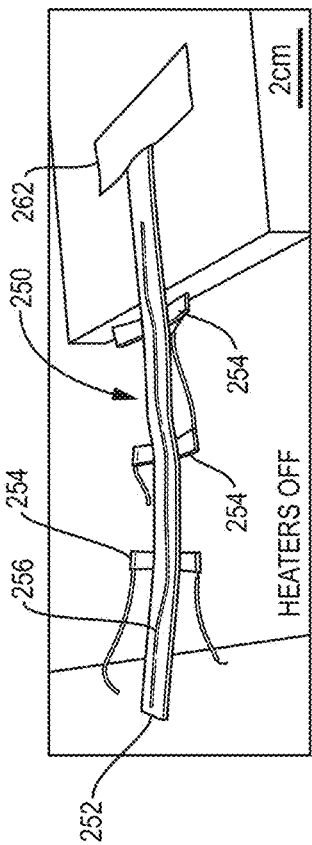
FIG. 17E shows the PEEK and thermally driven alloy beam of FIG. 16 after segmental actuation using selective heating in multiple zones after the heaters are turned off in an example embodiment of the present disclosure.

FIGS. 17A-E show the actuation sequence observed when the three heating elements 254 were turned on. Particularly, FIG. 17A shows the element 252 prior to segmental actuation with the heating elements 254, FIG. 17B shows the element 252 actuated in zone one by a first heating element 254 at a power of P=2 W, FIG. 17C shows the element 252 actuated in zone two by a second heating element 254 at a power of P=2 W, FIG. 17D shows the element 252 actuated in zone three by a third heating element 254 at a power of P=2 W, and FIG. 17E shows all heating elements 254 turned off and the element 254 returned to its original configuration. For each actuation region of the beam corresponding to a position of a respective heating element, lower displacements (smaller actuation angles) were observed for the composite beam when compared to the actuation of the copper beam and maximum actuation angles were reached in the zone corresponding with the heating element 254 closest to the clamp 262 (about 19°). This result was due to the higher stiffness and thickness of the PEEK beam 252 as compared with the copper beam. The actuation angles for each actuation region corresponding to a heating element zone are provided in Table 3 below, and confirm independent actuation of each region of the beam. As observed in the case of the copper beam, increasing the power increased the actuation angle observed after about 20 seconds. When the healing elements 254 were turned off, the beam 252 returned back to its initial position with some hysteresis due to the polymer plasticity observed when the beam was heated to temperatures higher than the PEEK glass transition temperature (Tg), e.g., for (T>140° C.). To remove the unwanted hysteresis, a thermally driven polymer that allows for actuation without resulting in permanent deformation can be used.

TABLE 3

Segmental Actuation of PEEK/Copper Beam

| Current (A) | Power (W) | Temp. (° C.) | Heating Element 1 (angle after 20 sec) | Heating Element 2 (angle after 20 sec) | Heating Element 3 (angle after 20 sec) |
| --- | --- | --- | --- | --- | --- |
| 0.2 | 1 | 82 | 0° | 10° | 10° |
| 0.3 | 2 | 135 | 0° | 10° | 10° |
| 0.4 | 3.5 | 160 | 8° | 15° | 19° |
| 0-heat off | 0 | 30 | 0° | 5° | 5° |

The experimentation demonstrated that versatile morphing of a beam can be achieved using local CNT heating elements and a SMA actuator. Although PEEK and copper beams were used, it should be understood that different thermally driven composites can be similarly actuated. For example, an array of SMA wires can be used to reinforce and actuate a polymeric matrix, while CNT heating elements can be used to trigger the actuation. Based on the materials chosen, different mechanical and thermal properties, an increasing number of individually actuated regions or segments of the beam, and increasing actuation angles can be achieved.

Figure 18:
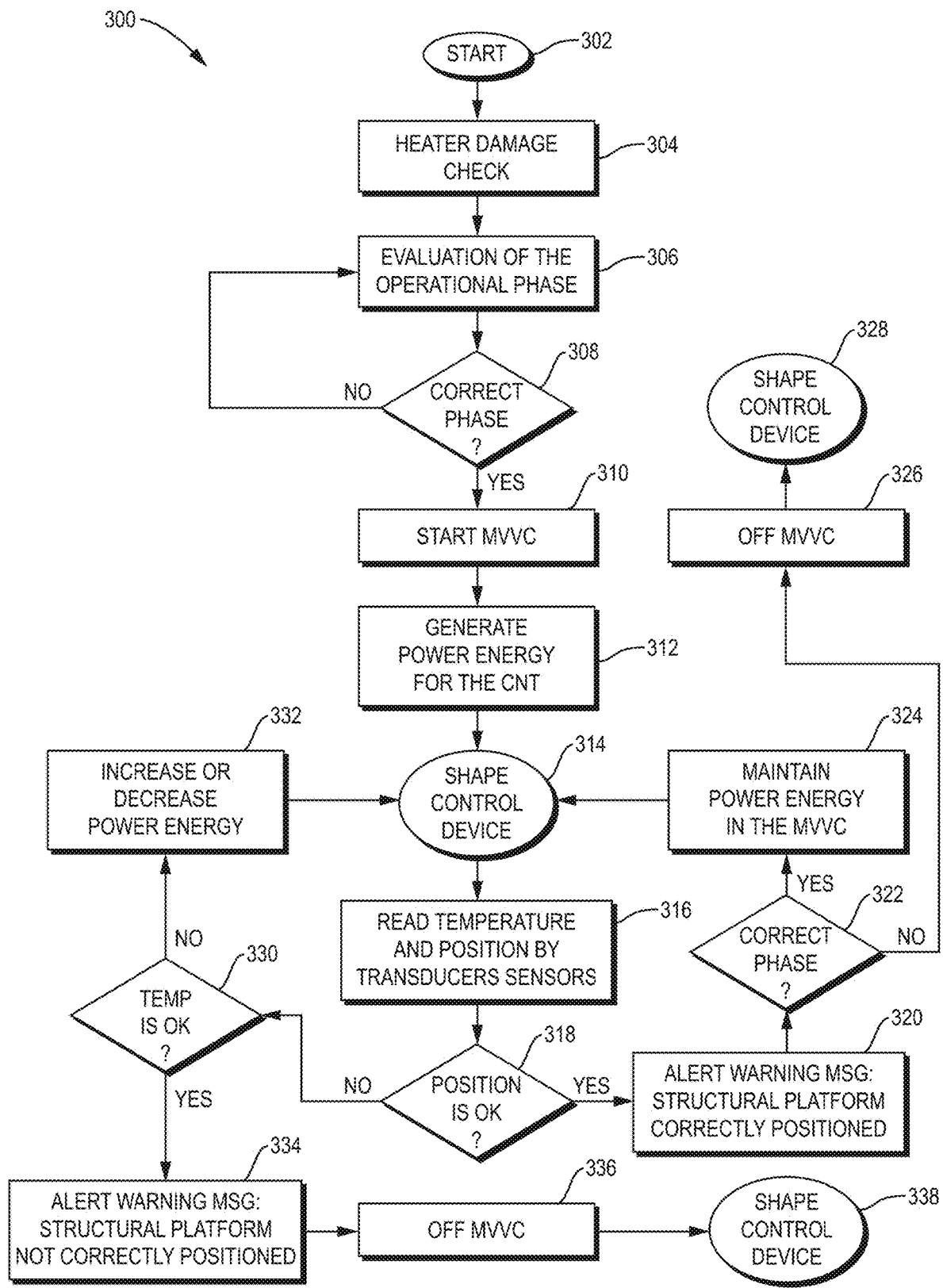
FIG. 18 is a flowchart of an exemplary process of operating a thermally driven actuator system according to some embodiments the present disclosure.

FIG. 18 is a flowchart of an exemplary process 300 of operating a thermally driven actuator system according to the present disclosure for adjusting the position of an external structural element (e.g., a wingtip of an aircraft). At step 302, the process 300 begins. At step 304, the system determines whether damage to one of the heating elements is detected. In some embodiments, one or more sensors of the system can be used to detect whether the heating element is damaged. In some embodiments employing a heating element including a CNT network, the intrinsic resistance of the CNT network, based on a voltage drop across the CNT network or a current through the CNT network, is measured to determine whether the heating element is damaged. In some embodiments, if damage to a heating element above a threshold is detected, a warning message is sent to a user interface (not shown). At step 306, an evaluation of the operation phase of the aircraft is determined (e.g., whether the aircraft is descending, turning, ascending, or the like). At step 308, a determination of whether the operation phase is correct is made. If the operational phase is incorrect, step 306 is repeated to ensure the proper operation phase is taking place. Determination of whether the operation phase is correct can be performed by an external system including multiple sensors. As an example, Operational Loads Monitoring (OLM) can be used to determine the operational flight phase of an aircraft using flight parameters, such as acceleration, altitude, speed, or the like.

If the operational phase is correct, the process 300 continues to step 310. At step 310, a controller, (e.g., a multiplexed variable voltage controller (MVVC)), is started. At step 312, power is delivered to the heating element or elements (e.g., a CNT network sheet with zones). At step 316, the temperature and position of the thermally driven element and/or heating element are detected and transmitted to the controller via transducers and/or sensors. In FIG. 18, the thermally driven actuation system is collectively referred to as the shape control device. At step 318, a determination is made whether the position of the thermally driven element, heating element and/or structural element is in the desired configuration. If the position is correct, at step 320 the system outputs an alert warning or message to the user interface indicating that the structural element or platform is correctly positioned. At step 322, a determination is made whether the correct operational phase is occurring. If yes, at step 324, the power energy in the MVVC is maintained and the process returns to step 314. If no, at step 326, power to the MVVC is turned off, and at step 328, the thermally driven actuator system is activated to change the position of the structural element.

If at step 318 the system determines that the position is not correct, at step 330, a determination is made whether the temperature of the heating element and/or the thermally driven element is correct. If no, at step 332, the system increases or decreases the power energy to the heating element to adjust the position of the structural element. If the temperature is correct, at step 334, an alert warning or message is output to the user interface indicating of the incorrect position of the structural element. At step 336, power energy to the MVVC is turned off. At step 338, the thermally driven actuator system is activated to change the position of the structural element.

Figure 19:
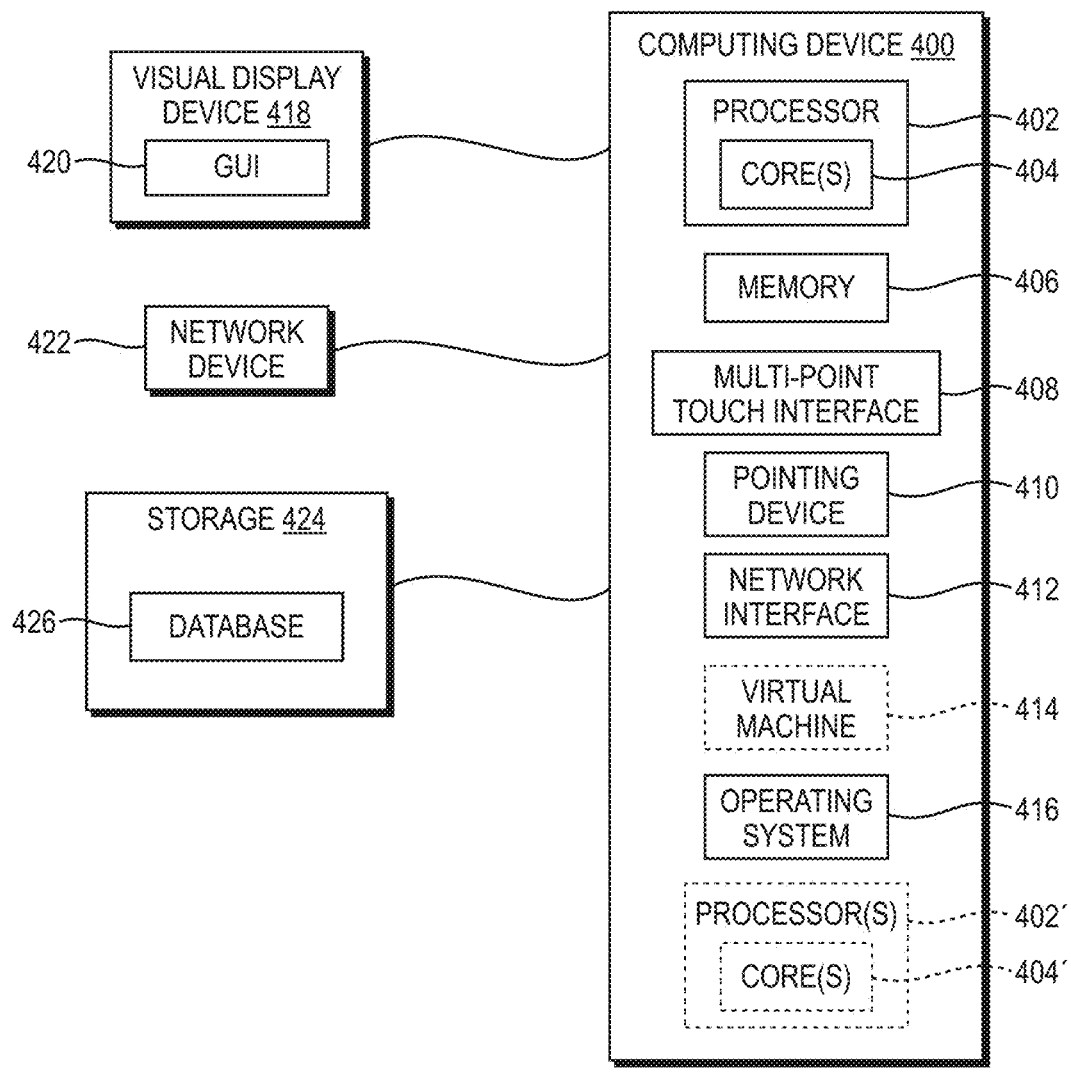
FIG. 19 is a block diagram of an exemplary computing device or controller of the thermally driven actuator system according to some embodiments of the present disclosure.

FIG. 19 is a block diagram of a computing device 40 (e.g., a processing device, a controller, or the like) that may be used with or incorporated into some embodiments. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for controlling the heating elements, instructions for controlling the sensors, instructions for controlling the transducers, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, an interface within an aircraft, or the like), such as a monitor, which may display one or more user interfaces 420 (e.g., GUI) that may be provided in accordance with exemplary embodiments. The computing device 400 may include other I/O devices for receiving input from a user, for example, a keyboard or any suitable multi-point touch interface 408, or a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement one or more portions of the thermally driven actuator system. Exemplary storage device 424 may also store one or more databases 426 for storing any suitable information required to implement exemplary embodiments. For example, exemplary storage device 424 can store one or more databases 426 for storing information, such as data relating to the temperature of each zone of the heating element, the temperature of each region of the thermally driven element, sensor data, transducer data, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a control interface, workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run an operating system 416, such as versions of the Microsoft® Windows® operating systems, the different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 416 may be run in native mode or emulated mode. In an exemplary embodiment, the operating system 416 may be run on one or more cloud machine instances.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A thermally driven actuator system, comprising:
a thermally driven element including one or more thermal shape memory materials capable of being selectively reconfigured in shape based on a temperature driven phase change at one or more predetermined temperatures and a second material coupled to the one or more thermal shape memory materials and capable of a change in dimension in proportion to temperature changes;
a plurality of heating elements coupled to and in thermal contact with the thermally driven element, the plurality of heating elements controllable to selectively and independently apply heat to one or more of a plurality of different regions of the thermally driven element to selectively raise a temperature or temperatures of the selected region or regions of the thermally driven element to selectively reconfigure the shape of the thermally driven element; and
a controller in communication with the plurality of heating elements for regulation of the heat applied to the plurality of different regions of the thermally driven element by the heating elements, the controller configured to:

control one or more of the plurality of heating elements to heat one or more regions of the thermally driven element to at least a first temperature associated with a phase change in at least one of the one or more thermal shape memory materials to transition the thermally driven element from a first configuration to a second configuration; and control the one or more of the plurality of heating elements to heat the one or more regions of the thermally driven element in a temperature range associated with the second material to transition the thermally driven element from the second configuration to another configuration in proportion with change in temperature, wherein the temperature range is above the first temperature.

2. The system according to claim 1, wherein the one or more thermal shape memory materials include a shape memory alloy and a shape memory polymer, and the second material includes a liquid crystal elastomer.

3. The system according to claim 1, wherein the one or more thermal shape memory materials are in electrical contact with the plurality of heating elements.

4. The system according to claim 1, wherein the plurality of heating elements are configured to selectively apply heat to the plurality of different regions of the thermally driven element in a variable heating pattern.

5. The system according to claim 1, wherein the thermally driven element is capable of being selectively reconfigured into shapes having three or more different configurations.

6. The system according to claim 1, wherein each of the plurality of heating elements corresponds to a zone configured to be independently heated and each of the plurality of heating elements is coupled to a corresponding one of the plurality of different regions of the thermally driven element.

7. The system according to claim 1, wherein the plurality of different regions are arranged longitudinally along a length of the thermally driven element.

8. The system according to claim 1, wherein the plurality of different regions are arranged laterally along a width of the thermally driven element.

9. The system according to claim 1, wherein some of the plurality of different regions are arranged laterally along a width of the thermally driven element and others of the plurality of different regions are arranged longitudinally along a length of the thermally driven element.

10. The system according to claim 1, wherein one or more of the plurality of heating elements comprise a carbon nanotube network.

11. The system according to claim 10, wherein the carbon nanotube network comprises a sheet of zones corresponding to the plurality of different regions of the thermally driven element, each zone configured to be independently heated.

12. The system according to claim 11, wherein one or more of the plurality of heating elements further comprise one or more dielectric layers connected to the carbon nanotube network.

13. The system according to claim 1, wherein one or more of the plurality of heating elements comprise heating wires passing through the respective heating element.

14. The system according to claim 1, further comprising a structural member including a surface to which a surface of the thermally driven element is coupled, and one or more transducers configured to detect a deflection of at least a portion of the structural member and transmit, to the controller, signals representing the detected deflection, and wherein the controller is configured to control one or more of the plurality of heating elements based on the signals received from the one or more transducers.

15. The system according to claim 1, wherein the controller comprises a multi-channel variable voltage controller or a multiplexed variable voltage controller.

16. The system according to claim 1, further comprising a sensor coupled to the thermally driven element or to at least one of the plurality of heating elements and configured to transmit a temperature signal regarding at least a portion of the thermally driven element to the controller.

17. The system according to claim 1, further comprising a plurality of sensors coupled to the thermally driven element or to at least one of the plurality of heating elements, each sensor configured to transmit a temperature signal regarding a corresponding region of the thermally driven element to the controller.

18. The system according to claim 1, further comprising one or more transducers coupled to the thermally driven element, the one or more transducers configured to transmit a signal or signals to the controller regarding a position or a deflection of at least a portion of the thermally driven element.

19. The system according to claim 1, wherein each of the plurality of heating elements has a first side facing toward the thermally driven element and a second side facing away from the thermally driven element, and wherein the system further comprises thermal insulation disposed on the second side of each of the plurality of heating elements.

20. The system according to claim 1, further comprising film adhesive encapsulating one or more of the plurality of heating elements.

21. The system according to claim 1, wherein the thermally driven element is configured to be coupled to a structural element such that reconfiguration of the shape of the thermally driven element substantially simultaneously reconfigures the shape of the structural element.

22. The system according to claim 21, wherein the thermally driven element constitutes a first thermally driven element and is configured to be coupled to a first portion of the structural element; and wherein the system further comprises:
  a second thermally driven element, different from the first thermally driven element, including one or more thermal shape memory materials capable of being selectively reconfigured in shape based on a thermal strain or temperature driven phase change, the second thermally driven element configured to be coupled to a second portion of the structural element; and
  one or more additional heating elements coupled to and in thermal contact with the second thermally driven element, the one or more additional heating elements controllable, by the controller, to selectively and independently apply heat to one or more of a plurality of different regions of the second thermally driven element to selectively raise a temperature or temperatures of the selected region or regions of the second thermally driven element to selectively reconfigure the shape of the second thermally driven element.

23. The system according to claim 1, wherein the plurality of heating elements include a flexible material that is foldable and/or rollable to position the heating elements in thermal contact with the thermally driven element.

24. The system according to claim 1, wherein the plurality of heating elements comprise a flexible material that is at least partially wrapped around a curved surface of the thermally driven element.

25. The system according to claim 1, wherein the thermally driven element includes a first thermal shape memory material and a second thermal shape memory material, the first temperature is associated with the phase change in the first thermal shape memory material, and the controller is further configured to: control the one or more of the plurality of heating elements to heat the one or more regions of the thermally driven element to at least a second temperature associated with a phase change of the second thermal shape memory material to transition the thermally driven element from the second configuration to a third configuration, wherein the second temperature is above the first temperature, and the temperature range is above the second temperature.

26. A thermally driven actuator, comprising:
a hybrid thermally driven element including one or more thermal shape memory materials capable of being selectively reconfigured in shape based on a temperature driven phase change at one or more predetermined temperatures and a liquid crystal elastomer capable of a change in dimension in proportion to temperature changes, the one or more thermal shape memory materials comprising at least one of a shape memory alloy and a shape memory polymer;
one or more heating elements coupled to and in thermal contact with the thermally driven element, the one or more heating elements controllable to selectively apply heat to one or more regions of the thermally driven element to raise a temperature or temperatures of the one or more regions to at least one of the one or more predetermined temperatures to reconfigure the shape of the thermally driven element; and
a controller in communication with the one or more heating elements for regulation of the heat applied to the one or more regions of the thermally driven element by the one or more heating elements, the controller configured to:
control the one or more heating elements to heat the one or more regions of the thermally driven element to at least a first temperature associated with a phase change in at least one of the one or more thermal shape memory materials to transition the thermally driven element from a first configuration to a second configuration; and
control the one or more heating elements to heat the one or more regions of the thermally driven element in a temperature range associated with the liquid crystal elastomer to transition the thermally driven element from the second configuration to another configuration in proportion with change in temperature, wherein the temperature range is above the first temperature.

27. The thermally driven actuator according to claim 26, wherein the one or more regions are a plurality of different regions, and wherein the one or more heating elements comprise a plurality of heating elements with each heating element coupled to a corresponding one of the plurality of different regions of the hybrid thermally driven element.

28. The thermally driven actuator according to claim 27, wherein the plurality of different regions are arranged longitudinally along a length of the hybrid thermally driven element.

29. The thermally driven actuator according to claim 27, wherein the plurality of different regions are arranged laterally along a width of the hybrid thermally driven element.

30. The thermally driven actuator according to claim 27, wherein some of the plurality of different regions are arranged laterally along a width of the hybrid thermally driven element and others of the plurality of different regions are arranged longitudinally along a length of the hybrid thermally driven element.

31. The thermally driven actuator according to claim 26, wherein the one or more heating elements comprise a carbon nanotube network.

32. The thermally driven actuator according to claim 31, wherein the one or more regions are a plurality of different regions, and wherein the carbon nanotube network comprises a sheet of zones corresponding to the plurality of different regions of the hybrid thermally driven element, the sheet of zones configured to be independently heated.

33. A method of reconfiguring a shape of a thermally driven element, the method comprising:
providing a thermally driven actuator system including the thermally driven element and one or more heating elements coupled to and in thermal contact with the thermally driven element, the thermally driven element including one or more thermal shape memory materials capable of being selectively reconfigured in shape based on a temperature driven phase change at one or more predetermined temperatures and a second material coupled to the one or more thermal shape memory materials and capable of a change in dimension in proportion to temperature changes, and a controller in communication with the one or more heating elements; and
using the controller, selectively and independently controlling supply of heat to one or more first regions of a plurality of different regions of the thermally driven element with the one or more heating elements to selectively raise a temperature or temperatures of the one or more first regions of the thermally driven element to at least a first temperature associated with a phase change in at least one of the one or more thermal shape memory materials to selectively reconfigure the shape of the thermally driven element from a first configuration to a second configuration; and
using the controller, selectively and independently controlling supply of heat to the one or more first regions with the one or more heating elements to selectively control the temperature or temperatures of the one or more first regions of the thermally driven element in a temperature range associated with the second material to transition the thermally driven element from the second configuration to another configuration in proportion with change in temperature, wherein the temperature range is above the first temperature.

34. The method of claim 33, further comprising using the controller,
selectively and independently controlling supply of heat to one or more second regions of the plurality of different regions of the thermally driven element with the one or more heating elements to selectively raise a temperature or temperatures of the one or more second regions of the thermally driven element to at least the first temperature associated with the phase change in at least one of the one or more thermal shape memory materials to selectively reconfigure the shape of the thermally driven element from the second configuration to a third configuration, wherein at least some of the regions in the one or more second regions are not included in the one or more first regions or at least some of the regions in the one or more first regions are not included in the one or more second regions.

35. The method of claim 34, further comprising using the controller,
selectively and independently controlling supply of heat to one or more third regions of the plurality of different regions of the thermally driven element with the one or more heating elements to selectively raise a temperature or temperatures of the one or more third regions of the thermally driven element to at least the first temperature associated with the phase change in at least one of the one or more thermal shape memory materials to selectively reconfigure the shape of the thermally driven element from the third configuration to a fourth configuration,
wherein at least some of the regions in the one or more third regions are not included in the one or more second regions or at least some of the regions in the one or more second regions are not included in the one or more third regions.

36. The method according to claim 33, wherein the one or more heating elements comprise a carbon nanotube network including a sheet of zones corresponding to the plurality of different regions of the thermally driven element, and the method comprises selectively and independently heating one or more of the zones of the carbon nanotube network.

37. The method according to claim 33, wherein the one or more heating elements comprise a carbon nanotube network, and wherein the method further comprises:
determining an intrinsic resistance of the carbon nanotube network based on a voltage drop across the carbon nanotube network or a current through the carbon nanotube network; and
determining whether the carbon nanotube network is damaged based on the intrinsic resistance of the carbon nanotube network.

38. The method according to claim 37, further comprising:
providing an alert to a user interface based on a determination that the carbon nanotube network is damaged.

39. The method according to claim 33, wherein the thermally driven actuator system further comprises a sensor coupled to the thermally driven element or to at least one of the one or more heating elements, and the method further comprises the controller receiving a temperature signal regarding at least a portion of the thermally driven element from the sensor.

40. The method according to claim 33, wherein the thermally driven actuator system further comprises a plurality of sensors coupled to the thermally driven element or to at least one of the one or more heating elements, and the method further comprises the controller receiving a temperature signal regarding a corresponding region of the thermally driven element from the plurality of sensors.

41. The method according to claim 33, wherein the thermally driven actuator system further comprises one or more transducers coupled to the thermally driven element or coupled to a structural element to which the thermally driven element is coupled, and the method further comprises the controller receiving a signal or signals regarding a position or a deflection of at least a portion of the thermally driven element or at least a portion of the structural element from the one or more transducers.

42. The method according to claim 41, further comprising:
determining whether a position or deflection of the at least a portion of the thermally driven element or of the at least a portion of the structural element is equal to a desired input position or deflection based on the signal or signals from the one or more transducers;
generating a positive output alert to a user interface where the position or deflection of the at least a portion of the thermally driven element or of the at least a portion of the structural element is determined to be equal to the desired input position or deflection; and
generating a negative output alert to the user interface where the position or deflection of the at least a portion of the thermally driven element or of the at least a portion of the structural element is determined to be different from the desired input position or deflection.

43. The method according to claim 33, wherein the thermally driven actuator system comprises an electroactive polymer, a magnetostrictive material, a magneto fluid, or any combination of the aforementioned.

44. The method according to claim 33, wherein the thermally driven actuator system further comprises one or more transducers coupled to the thermally driven element, and the method further comprises the controller receiving a signal or signals regarding parameter data including acceleration, strain, stress, load, position, or any combination of the aforementioned from the one or more transducers.

* * * * *